(12) United States Patent
Saiki et al.

(10) Patent No.: US 7,106,878 B2
(45) Date of Patent: Sep. 12, 2006

(54) SPEAKER AND MOBILE TERMINAL DEVICE

(75) Inventors: Shuji Saiki, Nara (JP); Sawako Usuki, Hyogo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 636 days.

(21) Appl. No.: 10/140,133

(22) Filed: May 7, 2002

(65) Prior Publication Data

US 2003/0003945 A1    Jan. 2, 2003

(30) Foreign Application Priority Data

May 8, 2001  (JP)  ............................. 2001-137012
Jul. 27, 2001  (JP)  ............................. 2001-227417

(51) Int. Cl.
    *H04R 25/00*  (2006.01)
(52) U.S. Cl. .................. 381/396; 381/182; 381/421
(58) Field of Classification Search ........ 381/337–342, 381/182, 396, 401–402, 421
    See application file for complete search history.

(56) References Cited

U.S. PATENT DOCUMENTS 5,832,079 A    11/1998    Rabe
5,894,263 A    4/1999    Shimakawa et al.

FOREIGN PATENT DOCUMENTS

| CN | 1376010 | 10/2002 |
| EP | 0 999 722 A2 | 5/2000 |
| EP | 1 073 312 A2 | 1/2001 |
| JP | 56-140292 | 3/1955 |
| JP | 62-277090 | 12/1987 |
| JP | 4-19899 | 2/1992 |
| JP | 04-135096 | 5/1992 |
| JP | 10-215499 | 8/1998 |
| JP | 11-252683 | 9/1999 |
| JP | 2000-510293 | 8/2000 |
| JP | 2000-244993 | 9/2000 |
| JP | 2001-119773 | 4/2001 |
| JP | 2001-259525 | 9/2001 |

OTHER PUBLICATIONS

Chinese Office Action dated Jan. 2, 2004.
Japanese Office Action dated Jun. 29, 2005.
Communication and Search Report from European Patent Office (4 pages) Dated Aug. 4, 2003.

*Primary Examiner*—Suhan Ni
(74) *Attorney, Agent, or Firm*—RatnerPrestia

(57) ABSTRACT

A speaker includes a first magnet; a second magnet provided so as to surround the first magnet; a yoke for connecting the first magnet and the second magnet; a first voice coil; a second voice coil; a first diaphragm connected to the first voice coil; a second diaphragm oppositely provided to the first diaphragm with respect to the first magnet and connected to the second voice coil; a first magnetic plate provided between the first diaphragm and the first magnet; and a second magnetic plate provided between the second diaphragm and the first magnet. The first voice coil is provided in a first magnetic gap between the first magnetic plate and the yoke. The second voice coil is provided in a second magnetic gap between the second magnetic plate and the yoke.

12 Claims, 24 Drawing Sheets

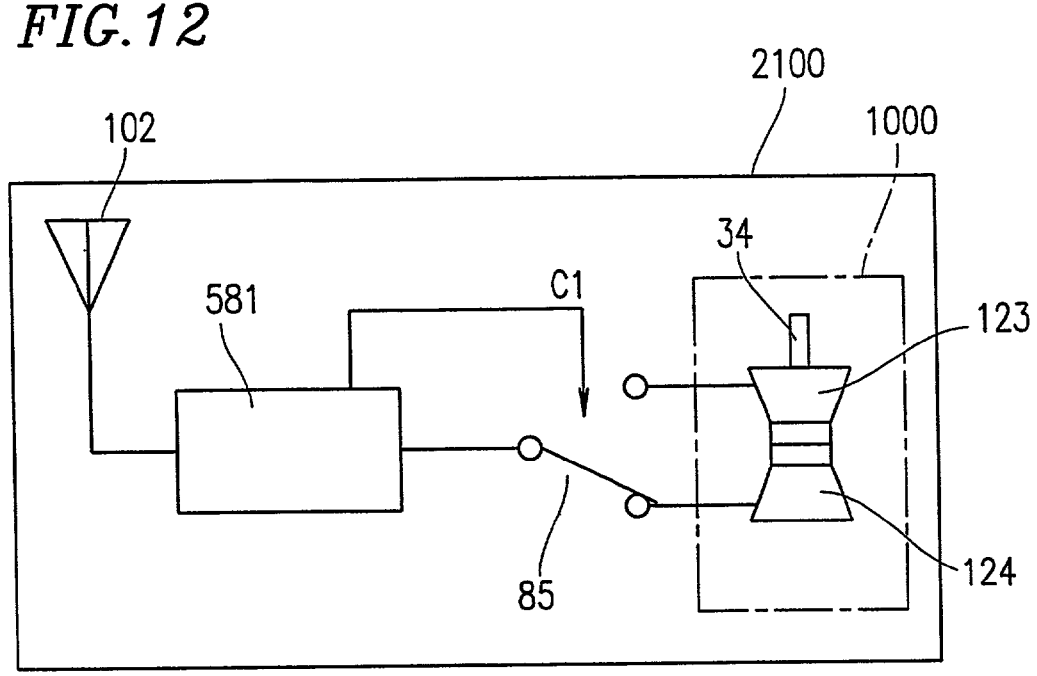

SPEAKER AND MOBILE TERMINAL DEVICE

BACKGROUND OF THE INVENTION

1. Field of the Invention

The present invention relates to a speaker including a plurality of diaphragms and a mobile terminal device having such a speaker mounted thereon.

2. Description of the Related Art

A speaker including one magnetic circuit and two diaphragms is disclosed in, for example, Japanese Laid-Open Publication No. 62-277000, Japanese Laid-Open Utility Model Publication No. 4-135096, and Japanese Laid-Open Publication No. 11-252683. The speaker disclosed in Japanese Laid-Open Publication No. 11-252683 will be described below.

FIG. 22 is a cross-sectional view of a speaker 3000 disclosed in Japanese Laid-Open Publication No. 11-252683. The speaker 3000 includes a pole piece 1 having a recessed portion which has a hole 14 at a center thereof, a yoke 2 which is recessed at a center thereof and having a hole 13, and a ring-shaped magnet 3 fixed between the pole piece 1 and the yoke 2. The yoke 2 acts as a frame. The speaker 3000 has a first magnetic gap 4 on an outer side of the magnet 3 and a second magnetic gap 5 on an inner side of the magnet 3. The speaker 3000 further includes a first voice coil 6 inserted into the first magnetic gap 4, a second voice coil 7 inserted into the second magnetic gap 5, a first diaphragm 8 having an outer peripheral area supported by the yoke 2 and a central area connected to the first voice coil 6, a second diaphragm 9 having an outer peripheral area supported by the yoke 2 and having a central area connected to the second voice coil 7, a first protector 10 provided so as to face the first diaphragm 8, and a second protector 11 provided so as to face the second diaphragm 9. The speaker 3000 is mounted on a printed circuit board 12 of a device. The printed circuit board 12 has a hole 15 aligned with the hole 13.

An exemplary operation of the speaker 3000 will be described. When an electric signal is input to the first voice coil 6, the first diaphragm 8 vibrates so as to generate a sound. The sound is output through the hole 13 of the yoke 2 and the hole 15 of the printed circuit board 12. The holes 13 and 15 are formed so as not to disturb the movement of the sound wave. When an electric signal is input to the second voice coil 7, the second diaphragm 9 vibrates so as to generate a sound. The sound is output through the hole 14 of the pole piece 1, the hole 13 of the yoke 2, and the hole 15 of the printed circuit board 12. As well as the holes 13 and 15, the hole 14 is formed so as not to disturb the movement of the sound wave. In the state where the speaker 3000 is mounted on a cellular phone, the second diaphragm 9 is used as a receiver, and the first diaphragm 8 having a larger diameter than that of the second diaphragm 9 is used as a sounder for reproducing a calling sound.

Although not described in Japanese Laid-Open Publication No. 11-252683, the sound from the first and the second diaphragms 8 and 9 is usually directly output through holes formed in the first and second protectors 10 and 11.

Such a structure has the following problem. In a cellular phone, which is most popular among various mobile terminal devices, a liquid crystal display section provided on a front surface of a casing is now increasing in size in order to display a larger number of characters and a larger amount of image information. Such an increased size of the liquid crystal display section reduces a space available for a speaker for reproducing a calling sound which is adjacent to the liquid crystal display section. The speaker diameter was about 20 mm several years ago, but has now been reduced to about 10 mm or less. A simple reduction in size of the diaphragms or magnetic circuit made in accordance with the reduced space for the speaker results in problems, for example, in that a sufficient sound pressure level is not obtained and a sufficient volume of low frequency sound is not obtained. A speaker having a relatively large speaker diameter of 20 mm provides sufficient acoustic characteristics, but requires a large space to the side of the display section of the cellular phone due to the structure of the cellular phone of outputting the sound through the holes of the protectors. This conflicts with the increase in the size of the display section. The structure of outputting the sound through the holes of the protectors also limits the position from which the sound may be output to, for example, a portion above the display section.

The speaker 3000 further requires that an edge portion of the second diaphragm 9, which determines the minimum resonance frequency (i.e., a portion of the second diaphragm 9 between a position connected to the second voice coil 7 and a position connected to the yoke 2), be sufficiently large. Otherwise, the stiffness of the edge portion is too large to sufficiently reproduce a low frequency sound. In order to make the edge portion large, the magnet 3 needs to be reduced in size so that the diameter of the second magnetic gap 5 is reduced or the diameter of the second diaphragm 9 needs to be increased. The diameter of the first magnetic gap 4 also needs to be reduced, or the diameter of the first diaphragm 8 needs to be increased. However, a reduction in the size of the magnet 3 causes the problem in that the magnetic energy becomes insufficient, resulting in a reduction in the driving efficiency of the speaker 3000. An increase in the diameter of the second diaphragm 9 causes the problem of an increase in the speaker diameter of the speaker 3000, resulting in an inability to save space.

In the speaker 3000, a bottom surface of the first diaphragm 8 and a top surface of the second diaphragm 9 are acoustically coupled to each other through the hole 14 of the pole piece 1. Therefore, when an electric signal is applied to the first voice coil 6 so as to reproduce a sound by the first diaphragm 8, the sound generated by the bottom surface of the first diaphragm 8 changes the air pressure on the top surface of the second diaphragm 9 through the hole 14, thereby vibrating the second diaphragm 9. This causes the problem in that even when no electric signal is applied to the second voice coil 7, a sound may be generated by the second diaphragm 9. Likewise, when an electric signal is applied to the second voice coil 7 so as to reproduce a sound by the second diaphragm 9, the first diaphragm 8 may be driven by the second diaphragm 9 to generate a sound. Due to these problems, the first diaphragm 8 and the second diaphragm 9 cannot be independently driven.

SUMMARY OF THE INVENTION

According to one aspect of the invention, a speaker includes a first magnet; a second magnet provided so as to surround the first magnet; a yoke for connecting the first magnet and the second magnet; a first voice coil; a second voice coil; a first diaphragm connected to the first voice coil; a second diaphragm oppositely provided to the first diaphragm with respect to the first magnet and connected to the second voice coil; a first magnetic plate provided between the first diaphragm and the first magnet; and a second magnetic plate provided between the second diaphragm and the second magnet. The first voice coil is provided in a first magnetic gap between the first magnetic plate and the yoke. The second voice coil is provided in a second magnetic gap between the second magnetic plate and the yoke.

In one embodiment of the invention, the speaker further includes a frame for supporting an outer peripheral area of the first diaphragm and an outer peripheral area of the second diaphragm.

In one embodiment of the invention, the speaker further includes a first acoustic pipe for transmitting a sound generated by the first diaphragm.

In one embodiment of the invention, the first acoustic pipe is located off a center of the first diaphragm.

In one embodiment of the invention, the speaker further includes a cover oppositely provided to the first magnet with respect to the first diaphragm for covering the first diaphragm, wherein the first acoustic pipe projects from a space between the first diaphragm and the cover.

In one embodiment of the invention, the first acoustic pipe projects from a space between the first diaphragm and the second magnet.

In one embodiment of the invention, the first acoustic pipe has a cross-sectional area which is constant in a longitudinal direction thereof.

In one embodiment of the invention, the first acoustic pipe has a horn shape.

In one embodiment of the invention, the first acoustic pipe has a portion having a cross-sectional area which is larger than a cross-sectional area of the remaining portion of the first acoustic pipe.

In one embodiment of the invention, the speaker further includes a second acoustic pipe for transmitting a sound generated by the second diaphragm.

In one embodiment of the invention, the yoke exists between the first magnet and the second magnet, between the first diaphragm and the second magnet, and between the second diaphragm and the first magnet.

According to another aspect of the invention, a speaker includes a yoke; a magnet provided so as to surround the yoke; a first voice coil; a second voice coil; a first diaphragm connected to the first voice coil; a second diaphragm oppositely provided to the first diaphragm with respect to the yoke and connected to the second voice coil; a first annular magnetic plate provided between the first diaphragm and the magnet; a second annular magnetic plate provided between the second diaphragm and the magnet; and a connecting member for connecting the yoke and the magnet. The first voice coil is provided in a first magnetic gap between the yoke and the first annular magnetic plate. The second voice coil is provided in a second magnetic gap between the yoke and the second annular magnetic plate.

In one embodiment of the invention, an inner diameter of the first annular magnetic plate is different from an inner diameter of the second annular magnetic plate.

In one embodiment of the invention, an inner diameter of the first annular magnetic plate is equal to an inner diameter of the second annular magnetic plate.

According to still another aspect of the invention, a mobile terminal device includes a casing; and a speaker provided in the casing. The speaker includes a first magnet; a second magnet provided so as to surround the first magnet; a yoke for connecting the first magnet and the second magnet; a first voice coil; a second voice coil; a first diaphragm connected to the first voice coil; a second diaphragm oppositely provided to the first diaphragm with respect to the first magnet and connected to the second voice coil; a first magnetic plate provided between the first diaphragm and the first magnet; and a second magnetic plate provided between the second diaphragm and the second magnet, wherein the first voice coil is provided in a first magnetic gap between the first magnetic plate and the yoke, and the second voice coil is provided in a second magnetic gap between the second magnetic plate and the yoke. The casing has a first sound hole for outputting a sound generated by the first diaphragm, and a second sound hole for outputting a sound generated by the second diaphragm.

In one embodiment of the invention, the mobile terminal device further includes at least one of a first acoustic pipe connected to the first sound hole, and a second acoustic pipe connected to the second sound hole.

In one embodiment of the invention, the mobile terminal device further includes an antenna for receiving a wireless signal; a signal output section for outputting an electric signal based on the received wireless signal; and a selection section for selecting whether the electric signal is to be output to the first voice coil or the second voice coil.

In one embodiment of the invention, the electric signal represents at least one of a received sound, a call arrival sound, music and voice.

In one embodiment of the invention, when the electric signal represents the received sound, the electric signal is output to the first voice coil and the speaker operates as a receiver, and when the signal represents at least one of the call arrival sound, music and voice, the electric signal is output to the second voice coil and the speaker operates as a loudspeaker.

In one embodiment of the invention, a resonance frequency of the first diaphragm is lower than a resonance frequency of the second diaphragm.

In one embodiment of the invention, the mobile terminal device further includes a display section in the vicinity of the first sound hole.

In one embodiment of the invention, the mobile terminal device further includes an antenna for receiving a wireless signal; and a signal output section for outputting the electric signal to the first voice coil and the second voice coil based on the received wireless signal.

In one embodiment of the invention, the electric signal includes an audio signal of a first channel and an audio signal of a second channel. The audio signal of the first channel is output to the first voice coil. The audio signal of the second channel is output to the second voice coil.

In one embodiment of the invention, the mobile terminal device further includes a display section. The first acoustic pipe and the second acoustic pipe each have a horn shape. The first sound hole and the second sound hole are provided on the same plane as that of the display section.

In one embodiment of the invention, the first acoustic pipe has a portion having a cross-sectional area which is larger than a cross-sectional area of the remaining portion of the first acoustic pipe, and the second acoustic pipe has a portion having a cross-sectional area which is larger than a cross-sectional area of the remaining portion of the second acoustic pipe.

In one embodiment of the invention, the first acoustic pipe and the second acoustic pipe are integrally formed with the casing.

In one embodiment of the invention, the first diaphragm and the second diaphragm are formed of different materials from each other.

In one embodiment of the invention, the mobile terminal device further includes an antenna for receiving a wireless signal; a signal output section for outputting the electric signal based on the received wireless signal; and an acoustic image adjusting section for adjusting the electric signal so as to adjust an acoustic image of a sound output from the speaker and outputting the adjusted electric signal to the first voice coil and the second voice coil.

In one embodiment of the invention, the electric signal includes audio signals of a plurality of channels.

In a speaker of one embodiment of the invention, a magnetization direction of the first magnet is opposite to a magnetization direction of the second magnet.

In a speaker of one embodiment of the invention, an area of the first diaphragm is different from an area of the second diaphragm.

In a speaker of one embodiment of the invention, an area of the first diaphragm is smaller than an area of the second diaphragm.

In one embodiment of the invention, the speaker further includes an acoustic pipe connected to the first sound hole. The first sound hole and the second sound hole are provided in different surfaces of the casing. The speaker is provided so that the second diaphragm faces the second sound hole.

Thus, the invention described herein makes possible the advantages of providing (1) a compact speaker having a high driving efficiency, which generates a loud sound and has superb driving characteristics and acoustic characteristics; (2) a speaker having a high level of freedom in terms of location in a mobile terminal device, and (3) a mobile terminal device having such a speaker mounted thereon.

These and other advantages of the present invention will become apparent to those skilled in the art upon reading and understanding the following detailed description with reference to the accompanying figures.

BRIEF DESCRIPTION OF THE DRAWINGS

FIG. 12 is a block diagram illustrating an internal structure of the mobile terminal device shown in FIGS. 11A, 11B and 11C;

DESCRIPTION OF THE PREFERRED EMBODIMENTS

Hereinafter, the present invention will be described by way of illustrative examples with reference to the accompanying drawings.

EXAMPLE 1

Figure 1A:
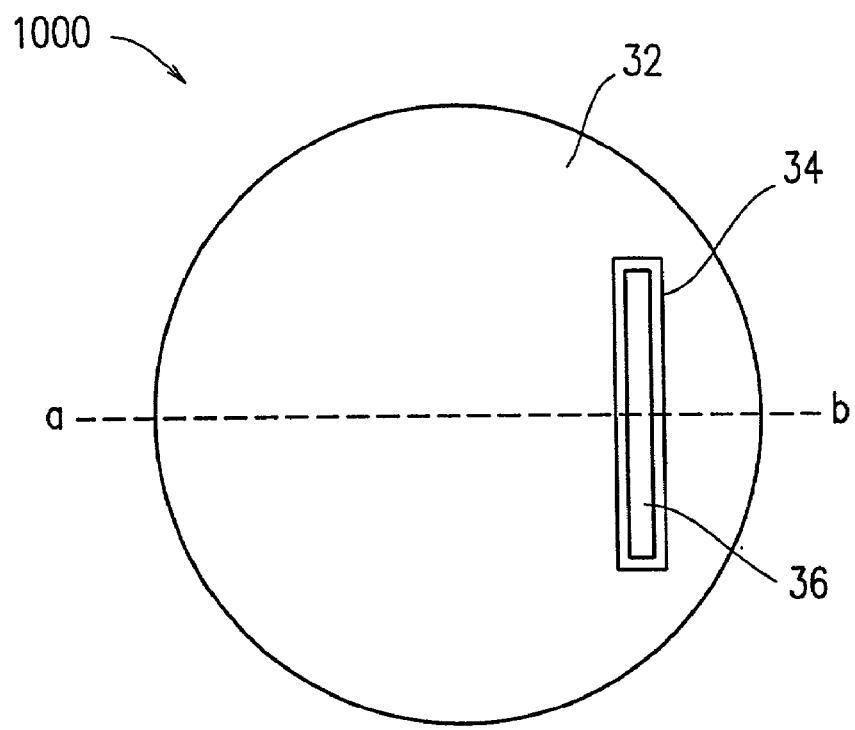
FIG. 1A is a plan view of a speaker according to a first example of the present invention.
Figure 1B:
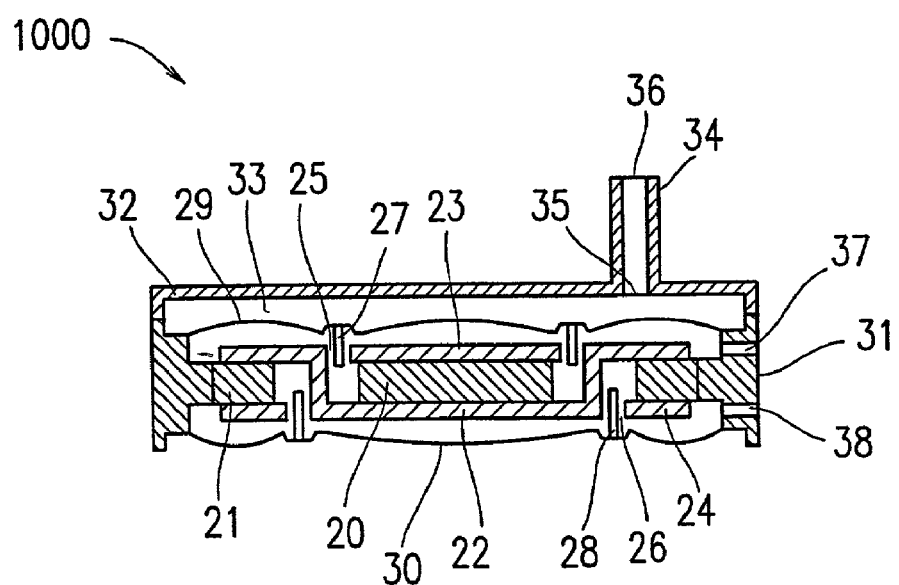
FIG. 1B is a cross-sectional view of the speaker shown in FIG. 1A taken along dashed line a–b in FIG. 1A.

With reference to FIGS. 1A and 1B, a speaker 1000 according to a first example of the present invention will be described. FIG. 1A is a plan view of the speaker 1000, and FIG. 1B is a cross-sectional view of the speaker 1000 taken along dashed line a–b in FIG. 1A.

The speaker 1000 includes a cylindrical first magnet 20, an annular second magnet 21 provided so as to surround the first magnet 20, a yoke 22 for integrally connecting the first magnet 20 and the second magnet 21, a first voice coil 27 provided in a first magnetic gap 25 between the first magnet 20 and the yoke 22, a second voice coil 28 provided in a second magnetic gap 26 between the second magnet 21 and the yoke 22, a first diaphragm 29 connected to the first voice coil 27, a second diaphragm 30 oppositely provided to the first diaphragm 29 with respect to the first magnet 20 and connected to the second voice coil 28, a disc-shaped first magnetic plate 23 provided between the first diaphragm 29 and the first magnet 20, a second magnetic plate 24 provided between the second diaphragm 30 and the second magnet 21, a frame 31 for supporting an outer peripheral area of each of the first diaphragm 29, the second diaphragm 30 and the second magnet 21, and a cover 32 oppositely provided to the first magnet 20 with respect to the first diaphragm 29 for covering the first diaphragm 29.

The first magnetic gap 25 exists among the first magnet 20, the first magnetic plate 23 and the yoke 22. The second magnetic gap 26 exists among the second magnet 21, the second magnetic plate 24 and the yoke 22. The first voice coil 27 is inserted into the first magnetic gap 25, and the second voice coil 28 is inserted into the second magnetic gap 26. The yoke 22 is located between the first magnet 20 and the second magnet 21, between the first diaphragm 29 and the second magnet 21, and between the second diaphragm 30 and the first magnet 20. A central area of the yoke 22 is recessed. A magnetic circuit includes the first magnet 20, the second magnet 21, the first magnetic plate 23, the second magnetic plate 24, and the yoke 22.

An space 33 exists between the cover 32 and the first diaphragm 29. The frame 31 has a plurality of sound holes 37 for communicating a space between the first diaphragm 29 and the second magnet 21 to the outside the speaker 1000, and a plurality of sound holes 38 for communicating a space between the second diaphragm 30 and the second magnet 21 to the outside of the speaker 1000. The plurality of sound holes 37 and 38 are formed so as to avoid the minimum resonating frequencies of the first and second diaphragms 29 and 30 from being increased by the stiffness of the air between the first diaphragm 29 and the second magnet 21 and the air between the second diaphragm 30 and the second magnet 21. The speaker 1000 has the structure in which the first diaphragm 29 and the second diaphragm 30 face each other and the first magnetic gap 25 and the second magnetic gap 26 face each other between the first diaphragm 29 and the second diaphragm 30. Owing to such a structure, the speaker 1000 can be thin.

The speaker 1000 further includes an acoustic pipe 34 having a throat 35 and an opening 36. The throat 35 is provided at a location of the cover 32 which is off the center of the first diaphragm 29. The acoustic pipe 34 projects from the space 33. The acoustic pipe 34 has a quadrangular cross-section in the horizontal direction. The cross-sectional area of the acoustic pipe 34 is smaller than the planar area of the first diaphragm 29. The cross-sectional area of the acoustic pipe 34 is constant in a longitudinal or vertical direction thereof. In this specification, such a shape of the acoustic pipe is referred to as a "straight shape".

An exemplary operation of the speaker 1000 will be described.

When an electric signal is applied to the second voice coil 28 inserted into the second magnetic gap 26, a driving force is generated in the second voice coil 28. Thus, the second diaphragm 30 connected to the second voice coil 28 vibrates so as to generate a sound. Likewise, when an electric signal is applied to the first voice coil 27 inserted into the first magnetic gap 25, a driving force is generated in the first voice coil 27. Thus, the first diaphragm 29 connected to the first voice coil 27 vibrates so as to generate a sound.

Figure 22:
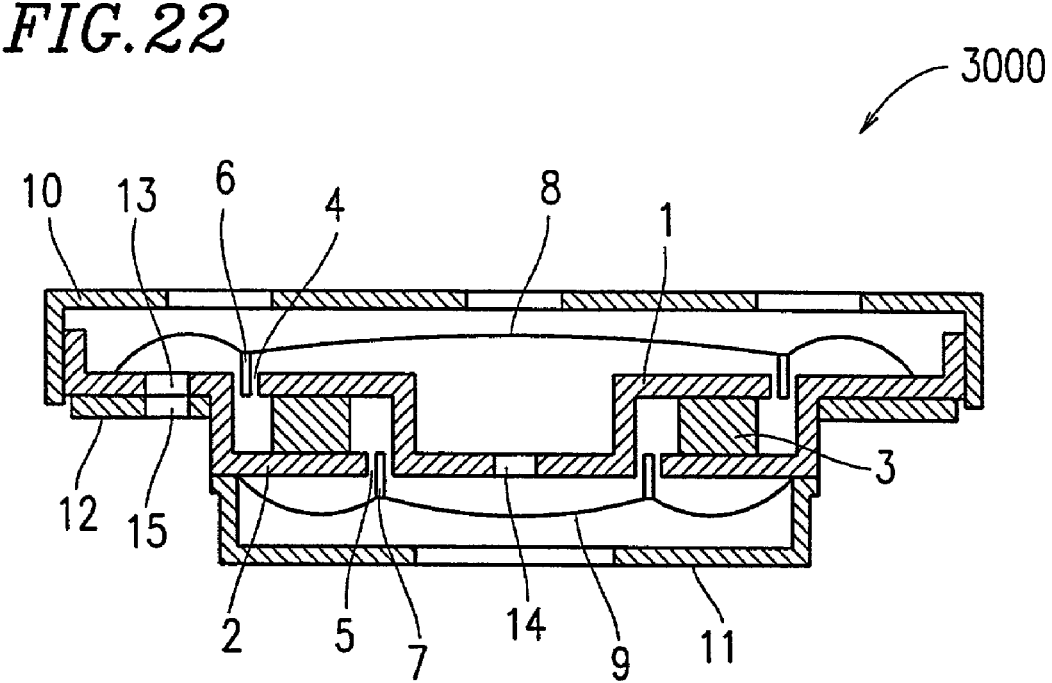
FIG. 22 is a cross-sectional view of a conventional speaker.

The first magnetic gap 25 is mainly supplied with a magnetic flux from the first magnet 20, and the second magnetic gap 26 is mainly supplied with a magnetic flux from the second magnet 21. Accordingly, the first voice coil 27 inserted into the first magnetic gap 25 is driven by the first magnet 20, and the second voice coil 28 inserted into the second magnetic gap 26 is driven by the second magnet 21. Since the first and second voice coils 27 and 28 are separately driven by the first and second magnets 20 and 21 respectively, the driving force generated in each of the first and second voice coils 27 and 28 can be larger than in the conventional speaker 3000 (FIG. 22) in which the first and second voice coils 6 and 7 are driven by one magnet 3. Therefore, the speaker 1000 can produce a louder sound than the conventional speaker 3000.

A top surface of the first diaphragm 29 is covered with the cover 32. Thus, the sound generated by the first diaphragm 29 is transmitted through the space 33, the throat 35 and the opening 36 of the acoustic pipe 34, and then is output to the outside of the speaker 1000. As can be appreciated, the speaker 1000 outputs the sound generated by the second diaphragm 30 directly downwards and outputs the sound generated by the first diaphragm 29 through the opening 36 after being transmitted through the acoustic pipe 34. The opening 36 may be provided at an arbitrary position above the cover 32. Even where the other elements of the speaker 1000 cannot be provided in the vicinity of the position from which the sound needs to be output, the sound can be output from the desirable position simply by locating the opening 36 at the desirable position, with the other elements of the speaker 1000 being located in another portion of the speaker 1000. Furthermore, the sound generated by the first diaphragm 29 and the sound generated by the second diaphragm 30 can be output from different positions, which are not necessarily close to each other.

The space between the first diaphragm 29 and the diaphragm 30 is substantially completely divided into two by the yoke 22. Therefore, a bottom or rear surface of the first diaphragm 29 and a top surface of the second diaphragm 30 are acoustically shielded from each other. This solves one of the problems of the conventional speaker 3000 (FIG. 22) that the sound generated by the bottom surface of the first diaphragm 8 directly vibrates the second diaphragm 9. Accordingly, the first diaphragm 29 and the second diaphragm 30 can act independently based on an electric signal applied thereto.

In the case where the first magnet 20 and the second magnet 21 are set, for example, to have different shapes or to be formed of different materials, the first magnetic gap 25 and the second magnetic gap 26 can have different magnetic flux densities. Thus, the acoustic characteristics of the sound output from each of the first diaphragm 29 and the second diaphragm 30 can be independently set in accordance with the objective.

The cover 32 and the acoustic pipe 34 may be eliminated.

EXAMPLE 2

Figure 2A:
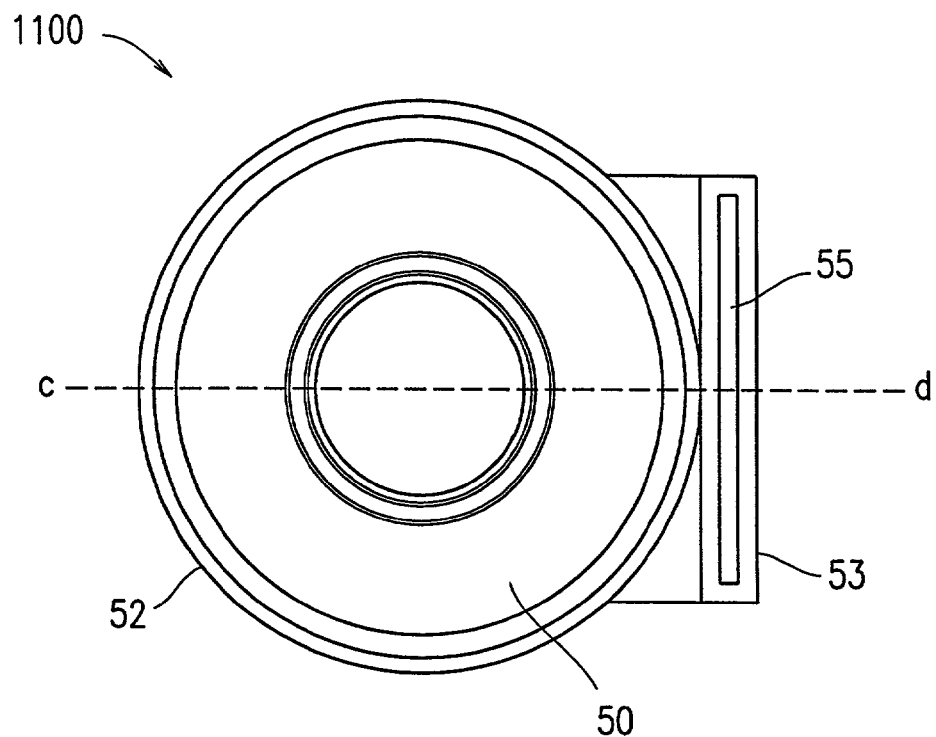
FIG. 2A is a plan view of a speaker according to a second example of the present invention.
Figure 2B:
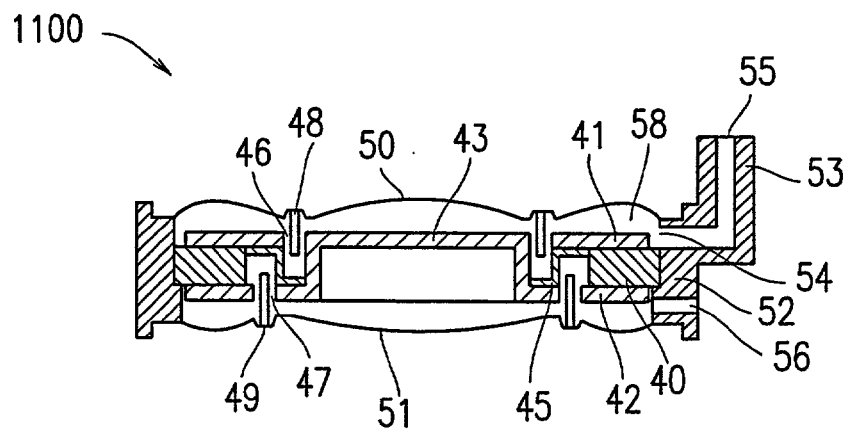
FIG. 2B is a cross-sectional view of the speaker shown in FIG. 2A taken along dashed line c–d in FIG. 2A.

With reference to FIGS. 2A and 2B, a speaker 1100 according to a second example of the present invention will be described. FIG. 2A is a plan view of the speaker 1100, and FIG. 2B is a cross-sectional view of the speaker 1100 taken along dashed line c–d in FIG. 2A.

The speaker 1100 includes a yoke 43, an annular magnet 40 provided so as to surround the yoke 43, a first voice coil 48 provided in a first magnetic gap 46 between the yoke 43 and the magnet 40, a second voice coil 49 provided in a second magnetic gap 47 between the yoke 43 and the magnet 40, a first diaphragm 50 connected to the first voice coil 48, a second diaphragm 51 oppositely provided to the first diaphragm 50 with respect to the yoke 43 and connected to the second voice coil 49, a first annular magnetic plate 41 provided between the first diaphragm 50 and the magnet 40, a second annular magnetic plate 42 provided between the second diaphragm 51 and the magnet 40, a non-magnetic connecting member 45 for connecting the yoke 43 and the first magnetic plate 41, and a frame 52 for supporting an outer peripheral area of each of the first diaphragm 50, the second diaphragm 51 and the magnet 40.

An inner diameter of the second magnetic plate 42 is larger than an inner diameter of the first magnetic plate 41. The yoke 43 includes a planar portion facing an inner peripheral edge of the second magnetic plate 42, a cylindrical portion facing an inner peripheral edge of the first magnetic plate 41, and a disc-shaped portion as a top portion of the cylindrical area. These portions are integrated together, so that a central area of the yoke 43 projects upwards. The frame 52 has a plurality of sound holes 56. The first magnetic gap 46 exists between an inner circumferential surface of the magnet 40/inner peripheral edge of the first magnetic plate 41 and an outer circumferential surface of the cylindrical portion of the yoke 43. The second magnetic gap 47 exists between an inner circumferential surface of the magnet 40/inner peripheral edge of the second magnetic plate 42 and an outer peripheral edge of the planar portion of the yoke 43. The first voice coil 48 is inserted into the first magnetic gap 46, and the second voice coil 49 is inserted into the second magnetic gap 47. A magnetic circuit includes the magnet 40, the first magnetic plate 41, the second magnetic plate 42 and the yoke 43. The speaker 1100 also includes a space 58 surrounded by the first diaphragm 50, the first magnetic plate 41, the first voice coil 48 and the frame 52.

The speaker 1100 further includes an acoustic pipe 53 having a throat 54 and an opening 55. The throat 54 is provided on a side surface of the frame 52, and the acoustic pipe 53 projects from the space 58. The acoustic pipe 53 has a quadrangular cross-section in the horizontal direction. The acoustic pipe 53 has a straight shape with a cross-sectional area being constant in a longitudinal or vertical direction thereof.

An exemplary operation of the speaker 1100 will be described.

When an electric signal is applied to the second voice coil 49 inserted into the second magnetic gap 47, a driving force is generated in the second voice coil 49. Thus, the second diaphragm 51 connected to the second voice coil 49 vibrates so as to generate a sound. Likewise, when an electric signal is applied to the first voice coil 46 inserted into the first magnetic gap 46, a driving force is generated in the first voice coil 48. Thus, the first diaphragm 50 connected to the first voice coil 48 vibrates so as to generate a sound.

Whereas the speaker 1000 in the first example shown in FIGS. 1A and 1B includes the two magnets 20 and 21, the speaker 1100 in the second example includes one magnet 40 which supplies a magnetic flux to both of the first and second magnetic gaps 46 and 47. Thus, the structure of the magnetic circuit is simplified.

In the conventional speaker 3000 (FIG. 22), one magnet 3 supplies a magnetic flux to each of the first and second magnetic gaps 4 and 5. Since the first and second voice coils 6 and 7 are provided on the outer side and the inner side of the magnet 3, the size of the magnet 3 cannot be increased in the horizontal direction, i.e., the planar direction of the diaphragms 8 and 9. Since the speaker 3000 has a limited space in which the magnet 3 can be located, the magnet 3 is inevitably small and the driving efficiency is significantly lowered, especially when the speaker 3000 has a small speaker diameter. When the magnet 3 is forcibly expanded in the horizontal direction, the width of the edge portion of the first diaphragm 8 is reduced, resulting in problems including an increase in the minimum resonance frequency occur. Here, the terms "width" is defined to mean the size along dashed line c–d.

In the speaker 1100 in the second example, the first and second voice coils 48 and 49 are both located in the space surrounded by the magnet 40. Therefore, the magnet 40 can be expanded outwards in the horizontal direction, which, in turn, allows a large magnitude of magnetic flux to be supplied to the first and second voice coils 48 and 49. Thus, a loud sound can be generated. Since the width of the edge portion of each of the first diaphragm 50 and the second diaphragm 51 can be enlarged, the minimum resonating frequencies of the first and second diaphragms 50 and 51 can be lowered. As a result, even a low frequency sound can be reproduced with superb acoustic characteristics. Desired acoustic characteristics can be realized since a sufficient magnetic energy is supplied from the magnet 40, located outside the first magnetic gap 46 and the second magnetic gap 47, to the first and second magnetic gaps 46 and 47.

A sound generated by the first diaphragm 50 is transmitted through the space 58 and the acoustic pipe 53, and then is output to the outside of the speaker 1100 through the opening 55. The acoustic pipe 53 provides the same effect as that described in the first example.

With the speaker 1000 in the first example (FIGS. 1A and 1B), the top surface of the first diaphragm 29 needs to be covered with the cover 32 so as to form the space 33. With the speaker 1100 in the second example, the sound is output through the space 58 and the cover 32 is not necessary. Thus, the structure of the speaker 1100 can be simplified.

The speaker 1100 is provided in a casing of a mobile terminal device or the like when practically used. Therefore, the sound output from the top surface of the first diaphragm 50 and the sound output through the acoustic pipe 53 are acoustically separated from each other and thus do not counteract each other. The plurality of holes 56 are formed in order to prevent the minimum resonance frequency of the second diaphragm 51 from being increased by the stiffness of the air between the second diaphragm 51 and the magnet 40. The sound output from the bottom surface of the second diaphragm 51 and the sound output through the holes 56 are also acoustically separated from each other in practical use.

The acoustic pipe 53 may be eliminated from the speaker 1100. The acoustic pipe 53 may be provided in the speaker 1000 (FIGS. 1A and 1B).

EXAMPLE 3

Figure 3A:
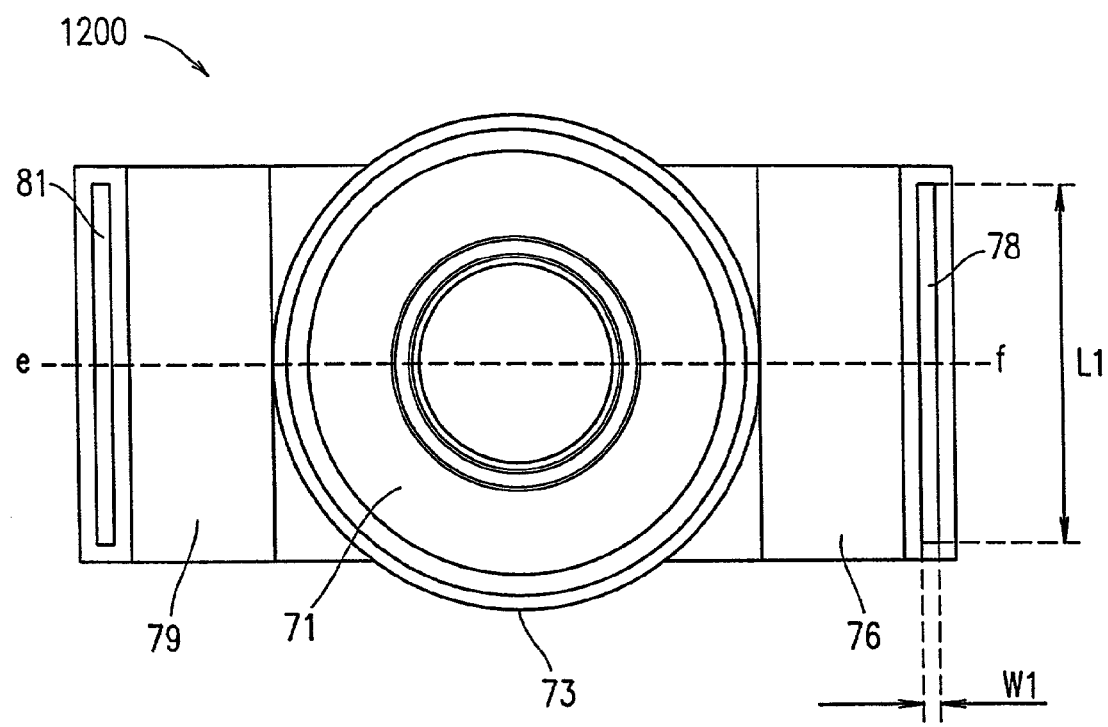
FIG. 3A is a plan view of a speaker according to a third example of the present invention.
Figure 3B:
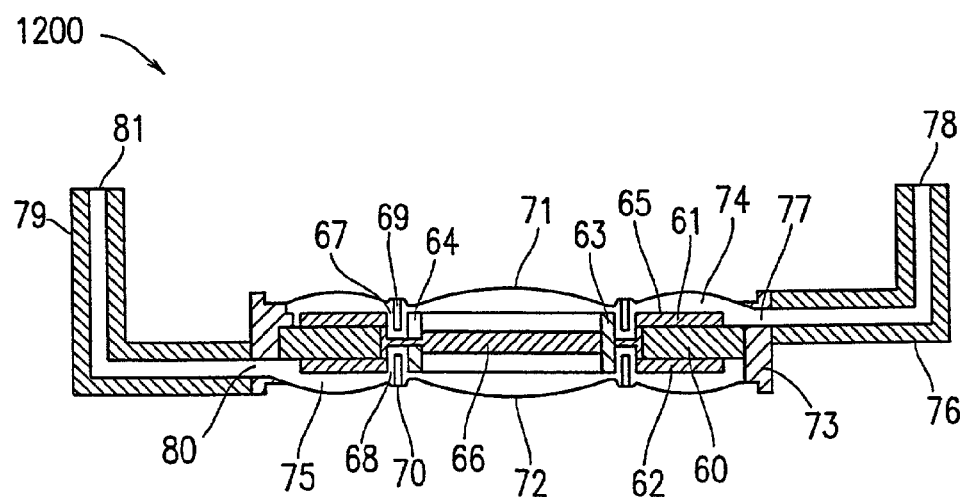
FIG. 3B is a cross-sectional view of the speaker shown in FIG. 3A taken along dashed line e–f in FIG. 3A.
Figure 4:
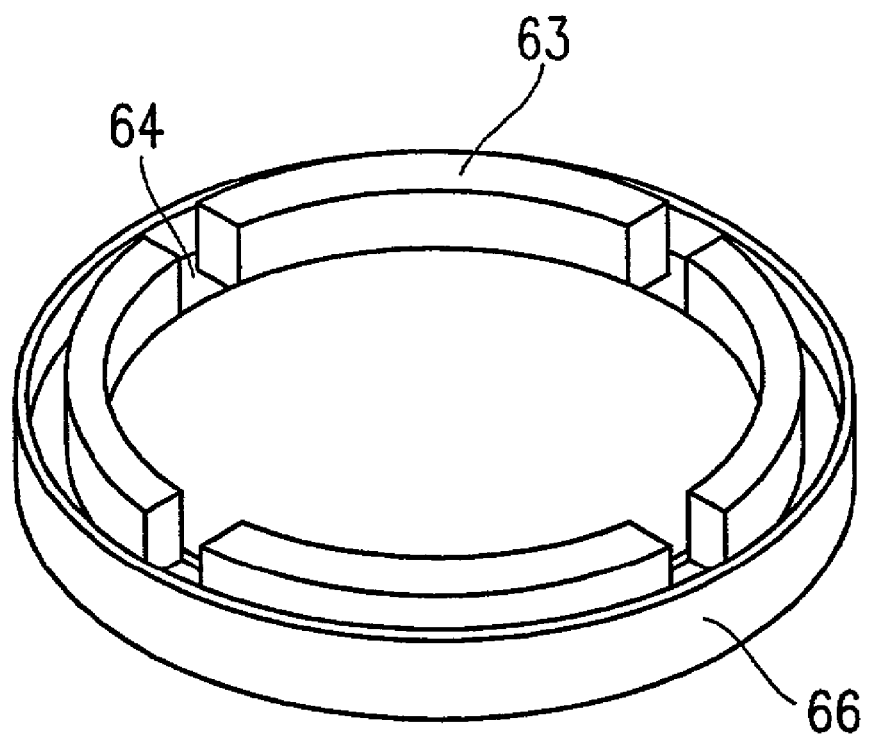
FIG. 4 is a perspective view of a yoke included in the speaker shown in FIGS. 3A and 3B.

With reference to FIGS. 3A, 3B and 4, a speaker 1200 according to a third example of the present invention will be described. FIG. 3A is a plan view of the speaker 1200, and FIG. 3B is a cross-sectional view of the speaker 1200 taken along dashed line e–f in FIG. 3A. FIG. 4 is a perspective view of a yoke 63 described below.

The speaker 1200 includes a yoke 63, an annular magnet 60 provided so as to surround the yoke 63, a first voice coil 69 provided in a first magnetic gap 67 between the yoke 63 and the magnet 60, a second voice coil 70 provided in a second magnetic gap 68 between the yoke 63 and the magnet 60, a first diaphragm 71 connected to the first voice coil 69, a second diaphragm 72 oppositely provided to the first diaphragm 71 with respect to the yoke 63 and connected to the second voice coil 70, a first annular magnetic plate 61 provided between the first diaphragm 71 and the magnet 60, a second annular magnetic plate 62 provided between the second diaphragm 72 and the magnet 60, a non-magnetic connecting member 66 for connecting the yoke 63 and the magnet 60, and a frame 73 for supporting an outer peripheral area of each of the first diaphragm 71, the second diaphragm 72 and the magnet 60.

An inner diameter of the first magnetic plate 61 is equal to an inner diameter of the second magnetic plate 62. The yoke 63 is cylindrical, and an outer circumferential surface of the yoke 63 faces an inner circumferential surface of the magnet 60, an inner peripheral edge of the first magnetic plate 61, and an inner peripheral edge of the second magnetic plate 62. As shown in FIG. 4, the yoke 63 has a plurality of slits 64 extended from a top edge of the yoke 63 to a central position of the yoke 63 in the height direction. The connecting member 66 is inserted into the slits 64 and fixed so as to be connected to the magnet 60.

The first magnetic gap 67 exists between the inner circumferential surface of the magnet 60/inner peripheral edge of the first magnetic plate 61 and the outer circumferential surface of the yoke 63. The second magnetic gap 68 exists between the inner circumferential surface of the magnet 60/inner peripheral edge of the second magnetic plate 62 and the outer circumferential surface of the yoke 63. The first voice coil 69 is inserted into the first magnetic gap 67, and the second voice coil 70 is inserted into the second magnetic gap 68. A magnetic circuit includes the magnet 60, the first magnetic plate 61, the second magnetic plate 62 and the yoke 63. The speaker 1200 also includes a space 74 surrounded by the first diaphragm 71, the first magnetic plate 61, the first voice coil 69 and the frame 73, and a space 75 surrounded by the second diaphragm 72, the second magnetic plate 62, the second voice coil 70 and the frame 73.

The speaker 1200 further includes a first acoustic pipe 76 having a throat 77 and an opening 78, and a second acoustic pipe 79 having a throat 80 and an opening 81. The throat 77 is provided on a side surface of the frame 73, and the first acoustic pipe 76 projects from the space 74. The throat 80 is provided on a side surface of the frame 73, and the second acoustic pipe 79 projects from the space 75. The first acoustic pipe 76 and the second acoustic pipe 79 each have a quadrangular cross-section in the horizontal direction. The first acoustic pipe 76 and the second acoustic pipe 79 each have a straight shape with a cross-sectional area being constant in a longitudinal or vertical direction thereof. The first acoustic pipe 76 and the second acoustic pipe 79 extend in a direction substantially perpendicular to the direction in which the first and second diaphragms 71 and 72 vibrate.

An exemplary operation of the speaker 1200 will be described.

The operation of applying an electric signal to each of the first and second voice coils 69 and 70 so as to generate a sound from the first and second diaphragms 71 and 72 is substantially the same as that of the speaker 1000 (FIGS. 1A and 1B) in the first example and the speaker 1100 (FIGS. 2A and 2B) in the second example, and thus will not be described in detail here. The operation of the speaker 1200 is different from the operation of the speakers 1000 and 1100 on the following point. In the speaker 1200, the first and second magnetic gaps 69 and 70 have an equal size to each other. The first and second voice coils 69 and 70 have an equal size to each other. The first and second diaphragms 71 and 72 also have an equal size to each other. Owing to such a structure, the acoustic characteristics of the sounds output from the first and second diaphragms 71 and 72 can be substantially the same as each other. The speaker 1200 is effective as a stereo sound reproduction speaker for which the sounds output from two diaphragms are required to have the same acoustic characteristics.

The sounds generated by the first and second diaphragms 71 and 72 are respectively transmitted through the spaces 74 and 75 and are output through the openings 78 and 81 of the acoustic pipes 76 and 79. The acoustic pipes 76 and 79 extend in a direction substantially perpendicular to the direction in which the first and second diaphragms 71 and 72 vibrate as described above. Therefore, the openings 78 and 81 can be provided at positions away from the other elements of the speaker 1200 in the horizontal direction.

The speaker 1200 is provided in a casing of a mobile terminal device or the like when practically used. Therefore, the sound output from the top surface of the first diaphragm 71 and the sound output through the first acoustic pipe 76 are acoustically separated from each other and thus do not counteract each other. The sound output from the bottom surface of the second diaphragm 72 and the sound output through the second acoustic pipe 79 are also acoustically separated from each other and thus do not counteract each other.

The first and second acoustic pipes 76 and 79 may be eliminated from the speaker 1200. The first and second acoustic pipes 76 and 79 may be provided in the speaker 1000 in the first example and the speaker 1100 in the second example.

EXAMPLE 4

Figure 5A:
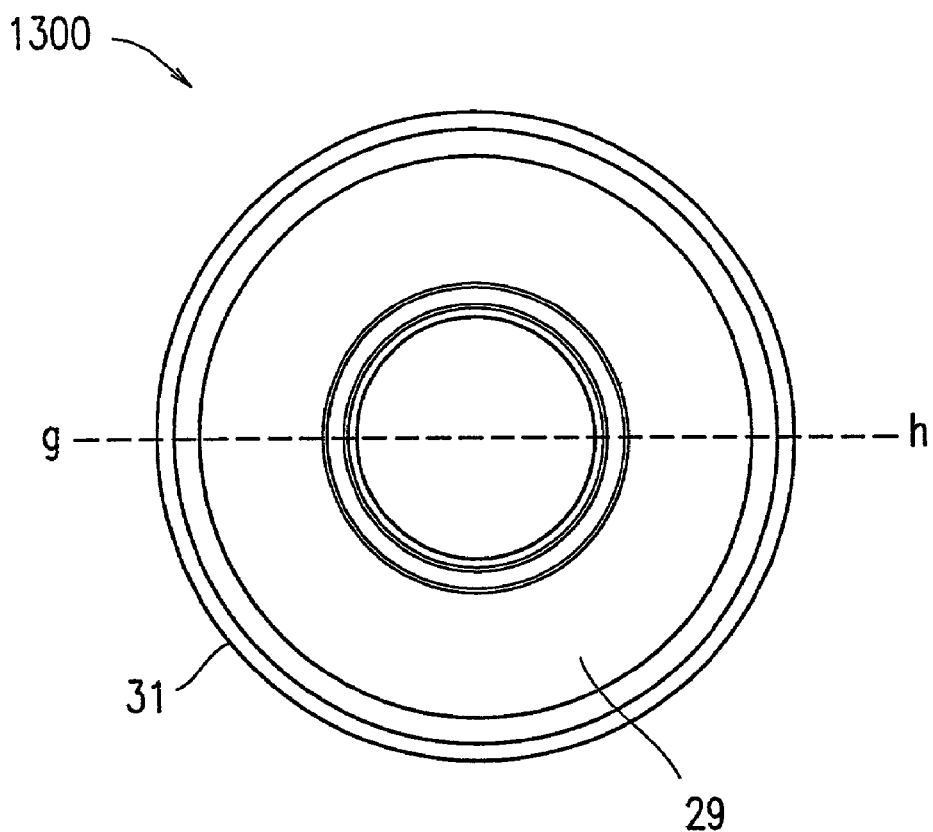
FIG. 5A is a plan view of a speaker according to a fourth example of the present invention.
Figure 5B:
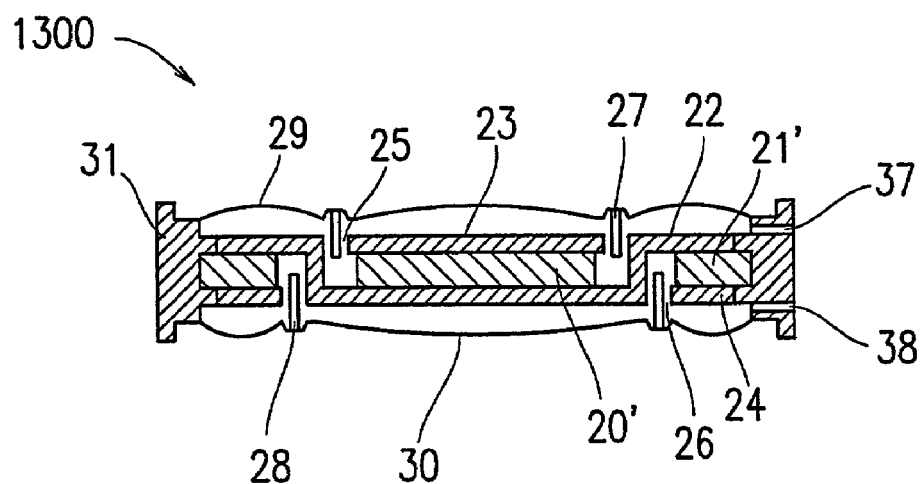
FIG. 5B is a cross-sectional view of the speaker shown in FIG. 5A taken along dashed line g–h in FIG. 5A.

With reference to FIGS. 5A and 5B, a speaker 1300 according to a fourth example of the present invention will be described. FIG. 5A is a plan view of the speaker 1300, and FIG. 5B is a cross-sectional view of the speaker 1300 taken along dashed line g–h in FIG. 5A.

The speaker 1300 is different from the speaker 1000 (FIGS. 1A and 1B) in the first example on the following points. The speaker 1300 includes a cylindrical first magnet 20' and an annular second magnet 21' provided so as to surround the first magnet 20'. The first magnet 20' and the second magnet 21' have opposite magnetization directions to each other. The speaker 1300 does not include the cover 32 or the acoustic pipe 34.

A feature of the speaker 1300 is that the first magnet 20' and the second magnet 21' are magnetized so as to have opposite magnetization directions to each other.

With reference to FIGS. 6A, 6B, 7A and 7B, the difference in the magnetic flux density between the first and second magnetic gaps 25 and 26 which is caused by the different magnetization directions will be described.

Figure 6A:
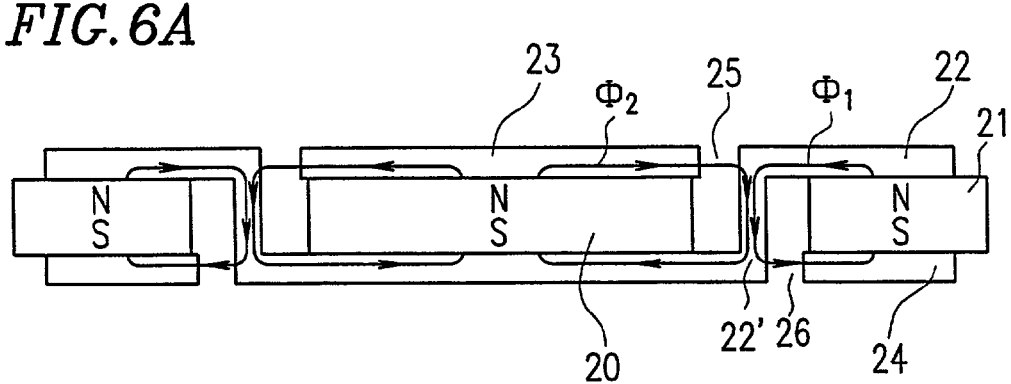
FIG. 6A shows a magnetic circuit of the speaker shown in FIGS. 1A and 1B.
Figure 6B:
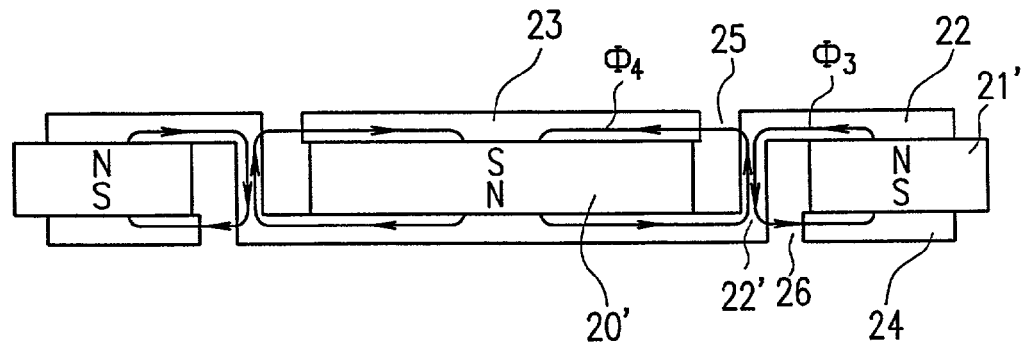
FIG. 6B shows a magnetic circuit of the speaker shown in FIGS. 5A and 5B.

FIG. 6A shows a magnetic circuit in the speaker 1000 including the first magnet 20, the second magnet 21, the first magnetic plate 23, the second magnetic plate 24, and the yoke 22 (FIG. 1B). FIG. 6B shows a magnetic circuit in the speaker 1300 including the first magnet 20', the second magnet 21', the first magnetic plate 23, the second magnetic plate 24, and the yoke 22 (FIG. 5B). The first magnet 20 and the second magnet 21 in FIG. 6A have the same magnetization direction. In FIGS. 6A and 6B, the arrows show the flow of the magnetic flux.

Figure 7A:
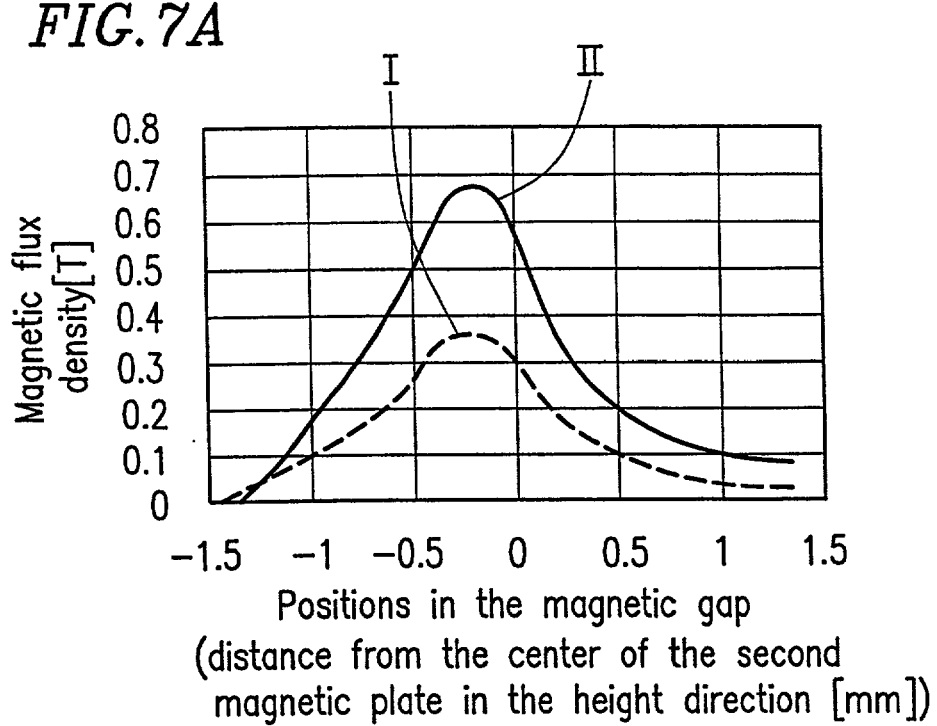
FIGS. 7A and 7B are graphs illustrating the magnetic flux densities in the speaker shown in FIGS. 1A and 1B and the speaker shown in FIGS. 5A and 5B.
Figure 7B:
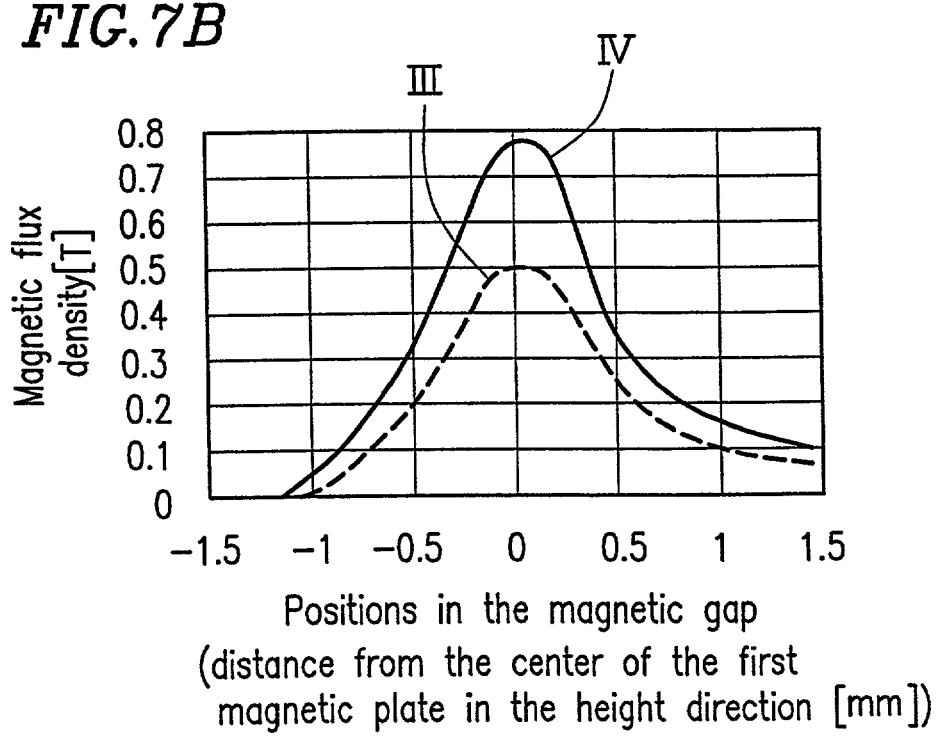

FIG. 7A is a graph illustrating the difference in the magnetic flux density distribution in the second magnetic gap 26 with respect to the height (i.e., with respect to the distance from the center of the second magnetic plate 24 in the height direction) between the speaker 1000 and speaker 1300. FIG. 7B is a graph illustrating the difference in the magnetic flux density distribution in the first magnetic gap 25 with respect to the height (i.e., with respect to the distance from the center of the first magnetic plate 23 in the height direction) between the speaker 1000 and speaker 1300.

Here, the first magnets 20 and 20' are both neodymium magnets and both have an outer diameter of 5.8 mm and a thickness of 1.1 mm. The second magnets 21 and 211 are both neodymium magnets and both have an inner diameter of 9.4 mm, an outer diameter of 13.8 mm, and a thickness of 1.1 mm. The first magnetic gap 25 has a width of 0.48 mm and a height of 0.4 mm. The second magnetic gap 26 has a width of 0.5 mm and a height of 0.4 mm. Here, the term "width" is defined to mean the size along dashed line g–h. The yoke 22, the first magnetic plate 23, and the second magnetic plate 24 each have a thickness of 0.4 mm.

The first magnet 20 and the second magnet 21 have the same magnetization direction. In this case, a magnetic flux $\Phi_1$ from the second magnet 21 and a magnetic flux $\Phi_2$ from the first magnet 20 flow as shown in FIG. 6A. The magnetic flux $\Phi_1$ from the second magnet 21 flows through a top portion and a vertical portion 22' of the yoke 22 and through the second magnetic gap 26, and then reaches the second magnetic plate 24. The magnetic flux $\phi_2$ from the first magnet 20 flows through the first magnetic plate 23 and the first magnetic gap 25, and the vertical section 22' of the yoke 22, and then reaches a bottom portion of the yoke 22. The magnetic fluxes $\Phi_1$ and $\Phi_2$ flow in the same direction through the vertical portion 22' of the yoke 22. Thus, the magnetic fluxes $\Phi_1$ and $\Phi_2$ are synthesized together, thus increasing the magnetic flux density in the vertical portion 22. When the resultant high density magnetic flux causes magnetic saturation in the vertical portion 22', the flow of the magnetic fluxes $\Phi_1$ and $\Phi_2$ is prevented. As a result, the magnetic flux density in the magnetic gaps 25 and 26 is reduced, and a sufficient driving force is not obtained.

The first magnet 20' and the second magnet 21' have opposite magnetization directions. In this case, as shown in FIG. 6B, the passages of a magnetic flux $\Phi_3$ from the second magnet 21' and a magnetic flux $\Phi_4$ from the first magnet 20' are the same as the passages of the magnetic fluxes shown in FIG. 6A, except for the direction of the flow. The magnetic flux $\Phi_3$ from the second magnet 21' flows through the top portion and the vertical portion 22' of the yoke 22 and through the second magnetic gap 26, and then reaches the second magnetic plate 24. The magnetic flux $\Phi_4$ from the first magnet 20' flows through the bottom portion and the vertical section 22' of the yoke 22 and through the first magnetic gap 25, and then reaches the first magnetic plate 23. The magnetic fluxes $\Phi_3$ and $\Phi_4$ flow in opposite directions through the vertical portion 22' of the yoke 22. Thus, the magnetic fluxes $\Phi_3$ and $\Phi_4$ counteract each other, thus decreasing the magnetic flux density in the vertical portion 22'. Therefore, magnetic saturation does not occur in the vertical portion 22'. This allows a significant increase in the magnetic flux density in the first and second magnetic gaps 25 and 26.

In FIG. 7A, curve I represents the magnetic flux density distribution in the first magnetic gap 25 in the speaker 1000 in which the first magnet 20 and the second magnet 21 have the same magnetization direction. Curve II represents the magnetic flux density distribution in the first magnetic gap 25 in the speaker 1300 in which the first magnet 20' and the second magnet 21' have opposite magnetization directions. As shown in FIG. 7A, the maximum value of the magnetic flux density in the first magnetic gap 25 is 0.36 T with curve I and 0.67 T with curve II. It is appreciated that the magnetic flux density is increased by 0.31 T by using the first magnet 20' and the second magnet 21' having opposite magnetization directions.

In FIG. 7B, curve III represents the magnetic flux density distribution in the second magnetic gap 26 in the speaker 1000 in which the first magnet 20 and the second magnet 21 have the same magnetization direction. Curve IV represents the magnetic flux density distribution in the second magnetic gap 26 in the speaker 1300 in which the first magnet 20' and the second magnet 21' have opposite magnetization directions. As shown in FIG. 7B, the maximum value of the magnetic flux density in the second magnetic gap 26 is 0.5 T with curve III and 0.77 T with curve IV. It is appreciated that the magnetic flux density is increased by 0.27 T by using the first magnet 20' and the second magnet 21' having opposite magnetization directions. By increasing the magnetic flux density in the first and second magnetic gaps 25 and 26, the driving force generated in the first and second voice coils 27 and 28 can be increased and thus a larger sound can be generated. Thus, a speaker generating a loud sound with a small size can be provided.

The speaker 1300 may include the cover 32 and the acoustic pipe 34 (FIGS. 1A and 1B). The speaker 1300 may include at least one of the first acoustic pipe 76 and the second acoustic pipe 79 (FIGS. 3A and 3B).

EXAMPLE 5

Figure 8A:
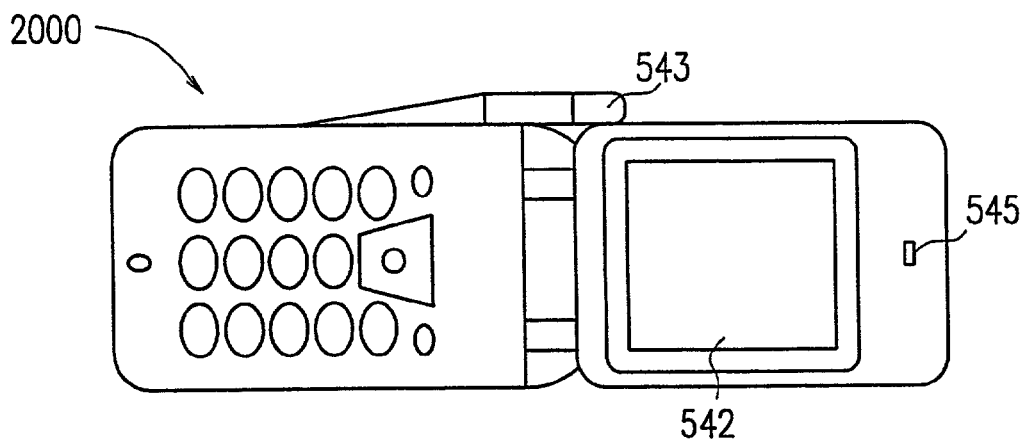
FIG. 8A is a plan view of a mobile terminal device according to a fifth example of the present invention.
Figure 8B:
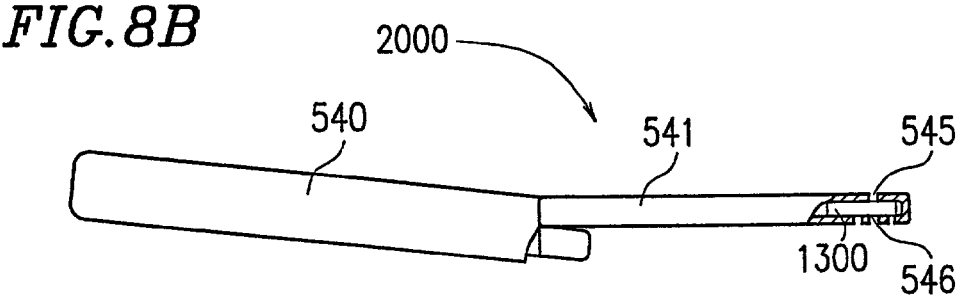
FIG. 8B is a partially cut side view of the mobile terminal device shown in FIG. 8A.
Figure 8C:
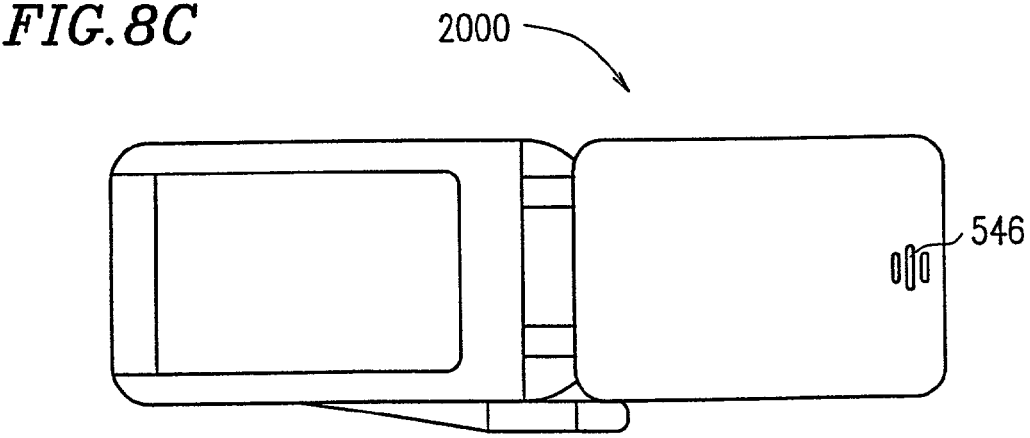
FIG. 8C is a rear view of the mobile terminal device shown in FIG. 8A.

A mobile terminal device 2000 according to a fifth example of the present invention will be described with reference to FIGS. 8A, 8B and 8C. FIG. 8A is a plan view of the mobile terminal device 2000, FIG. 8B is a partially cut side view thereof, and FIG. 8C is a rear view thereof.

In this example, the mobile terminal device 2000 is described as a cellular phone, but the mobile terminal device 2000 is not limited to a cellular phone but maybe, for example, a notebook computer, a PDA (personal digital assistant), a beeper, or a wrist watch.

The mobile terminal device 2000 includes a first casing 540, a second casing 541 connected to the first casing 540, a display section 542 provided in the second casing 541, a receiving antenna 543 attached to the first casing 540, and the speaker 1300 (FIGS. 5A and 5B) described in the fourth example. The second casing 541 includes a first sound hole 545 and a second sound hole 546.

The speaker 1300 is provided in the second casing 541 so that the first diaphragm 29 faces the first sound hole 545 and the second diaphragm 30 faces the second sound hole 546. The speaker 1300 may be replaced with a speaker obtained by removing the acoustic pipe 34 from the speaker 1000 in the first example, by removing the acoustic pipe 53 from the speaker 1100 in the second example, or by removing the acoustic pipe 76 and 79 from the speaker 1200.

The first casing 540 and the second casing 541 respectively accommodate electric circuits (not shown) such as, for example, a receiving circuit. The first casing 540 and the second casing 541 are connected to each other so as to be bendable at the connection point between those electric circuits.

An exemplary operation of the mobile terminal device 2000 will be described. The operation of the speaker 1300 is described above.

An electric signal representing a received sound (for example, the voice of a caller) is applied to the first voice coil 27 connected to the first diaphragm 29 of the speaker 1300. Thus, the received sound reproduced by the first diaphragm 29 is output through the first sound hole 545. In this case, the speaker 1300 acts as a receiver for reproducing the received sound.

An electric signal representing a call arrival sound, music, voice or the like informing the user of a call arrival (arrival of a call) is applied to the second voice coil 28 connected to the second diaphragm 30 of the speaker 1300. Thus, the call arrival sound, music, voice or the like generated by the second diaphragm 30 is output through the second sound hole 546. In this case, the speaker 1300 acts as a loudspeaker for reproducing the call arrival sound, music, voice or the like.

In a conventional mobile terminal device, a speaker acting as a receiver for reproducing a received sound and a speaker acting as a loudspeaker for reproducing a call arrival sound or the like are provided in a casing as separate units. Since the units each have its own magnetic circuit, the space for the speakers are inevitably enlarged and thus hampers size and thickness reduction. The speaker 1300 according to the present invention includes a plurality of diaphragms, and therefore one speaker 1300 can reproduce all the types of sounds. The speaker 1300 includes one magnetic circuit for the plurality of diaphragms and occupies a reduced space in the mobile terminal device 2000. Therefore, the mobile terminal device 2000 including the speaker 1300 can be reduced in size and thickness.

The speaker 1300 according to the present invention can output a relatively loud sound. The mobile terminal device 2000 including the speaker 1300 can output a larger sound than a mobile terminal device including a conventional speaker of the same size as that of the speaker 1300. Since a larger sound is output by the speaker 1300 when of the same size as that of a conventional speaker, the speaker 1300 can be reduced in size. The capacity of the mobile terminal device 2000 occupied by the speaker 1300 can be reduced.

The display section 542 may be polygonal, for example, rectangular. FIG. 5A shows the speaker 1300 as having a circular bottom surface, but the speaker 1300 may have a rectangular or elliptical bottom surface. In such a case, the speaker 1300 is preferably located so that a longer direction of the speaker 1300 is parallel to one of the sides of the profile of the display section 542. Then, the display section 542 can be extended in the shorter direction of the speaker 1300, thus increasing the size of the display section 542.

Figure 9:
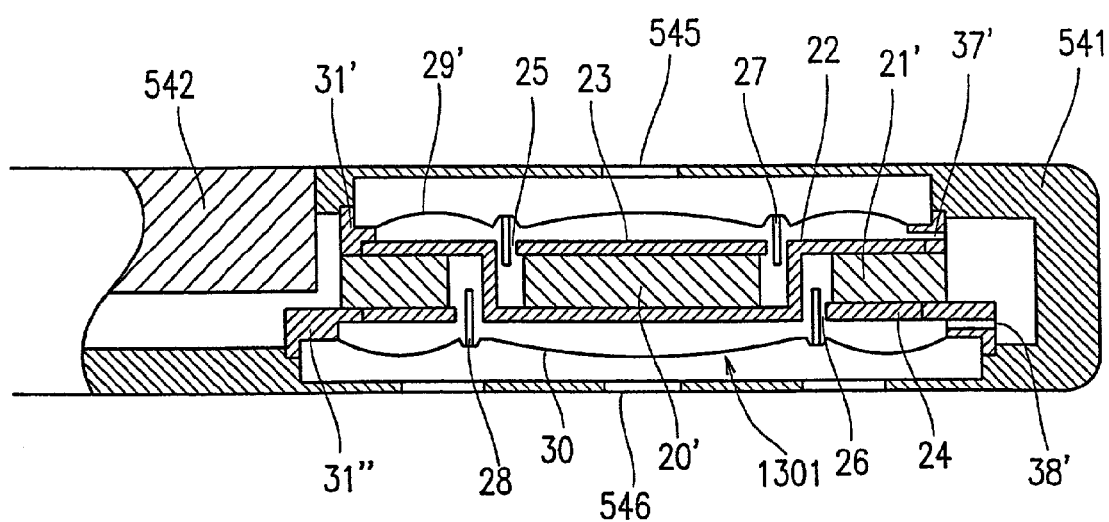
FIG. 9 is a cross-sectional view of a speaker usable in the mobile terminal device shown in FIGS. 8A, 8B and 8C.

With reference to FIG. 9, a speaker 1301 modified from the speaker 1300 will be described.

As shown in FIG. 9, the speaker 1301 is provided in the first casing 541 of the mobile terminal device 2000 (FIGS. 8A through 8C). The speaker 1301 includes a first diaphragm 29' connected to the first voice coil 27, a frame 31' for supporting an outer peripheral area of each of the first diaphragm 29' and the second magnet 21', and a frame 31" for supporting an outer peripheral area of each of the second diaphragm 30 and the second magnet 21'. The frame 31' has a plurality of first sound holes 37', and the frame 31" has a plurality of first sound holes 38'. The speaker 1301 has substantially the same structure as that of the speaker 1300 except for the above-mentioned points.

A basic operation of the speaker 1301 is the same as that of the speaker 1300. The speaker 1301 is different from the speaker 1300 in that the area of the first diaphragm 29' is smaller than the area of the second diaphragm 30 and that the outer diameter of the first frame 31' is smaller than the outer diameter of the second frame 31" accordingly. Owing to such a structure, the diameter of the top portion of the speaker 1301 facing the first sound hole 545 which is adjacent to or in the vicinity of the display section 542 can be reduced. As a result, the display section 542 for displaying image information such as e-mails and video can be enlarged.

Even when there is not a sufficient space for a speaker in the vicinity of the display section 542, the speaker 1301 is effective. In this example, when the speaker 1301 is used as a receiver, the sound is generated by the first diaphragm 29'. The user usually contacts his/her ear to the first sound hole 545 to listen to the received sound. Therefore, the first diaphragm 29' does not need to generate a sound having a high sound pressure as a loudspeaker. Even when the volume of the sound generated by the first diaphragm 29' is relatively small due to the small outer diameter of the first diaphragm 29', no practical problem occurs.

Since the outer diameter of the first voice coil 27 is smaller, the edge portion of the first diaphragm 29' is wider. This lowers the minimum resonance frequency of the first diaphragm 29'. The minimum resonance frequency of the first diaphragm 29' is preferably lower than the minimum resonance frequency of the second diaphragm 30. By lowering the minimum resonance frequency of the first diaphragm 29', the sound pressure level of the low frequency sound generated by the first diaphragm 29' is raised. This prevents the occurrence of a lack of low frequency sound which is caused by a sound leak in the gap between the ear of the user and the first sound hole 545.

Figure 10:
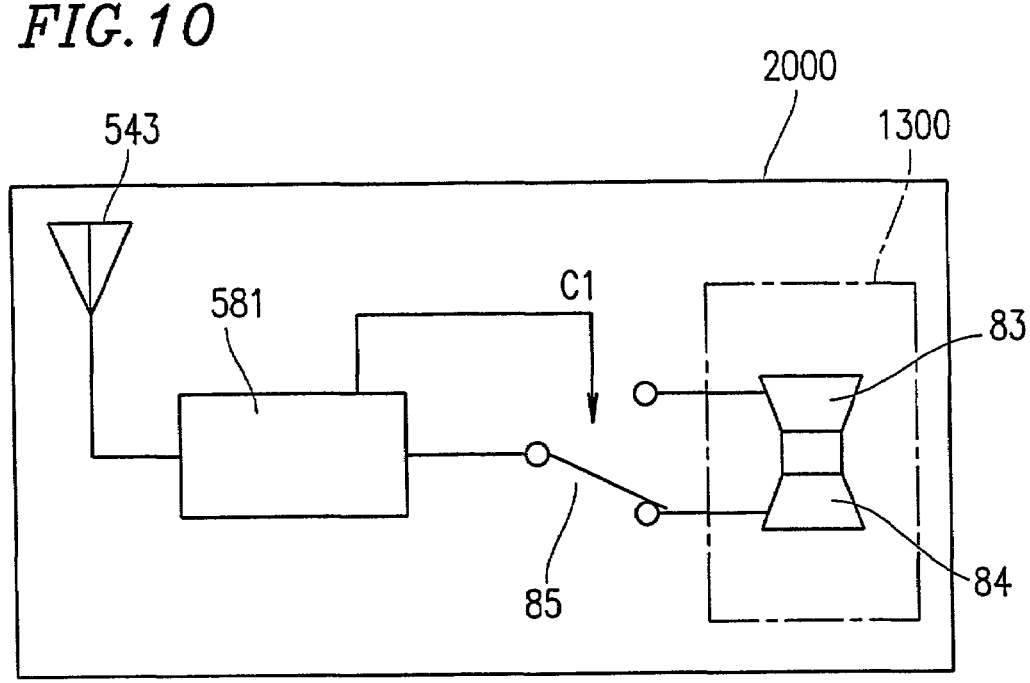
FIG. 10 is a block diagram illustrating an internal structure of the mobile terminal device shown in FIGS. 8A, 8B and 8C.

Next, the operation of the mobile terminal device 2000 will be further described with reference to FIG. 10. FIG. 10 is a block diagram illustrating an internal structure of the mobile terminal device 2000.

The mobile terminal device 2000 including the speaker 1300 further includes a signal output section 581 for outputting an electric signal based on a wireless signal received by the antenna 543, and a selection section 85 for selecting whether the electric signal is to be output to the first voice coil 27 or the second voice coil 28. The speaker 1300 includes a first electric signal/acoustic signal conversion section 83, which includes the first diaphragm 29, the first voice coil 27 and the magnetic circuit. The speaker 1300 also includes a second electric signal/acoustic signal conversion section 84, which includes the second diaphragm 30, the second voice coil 28 and the magnetic circuit. The magnetic circuit of the speaker 1300 includes the first magnet 20', the second magnet 21', the first magnetic plate 23, the second magnetic plate 24, and the yoke 22 as shown in FIG. 6B, and is shared by the first and second electric signal/acoustic signal conversion sections 83 and 84.

The antenna 543 receives a wireless signal which is externally sent (e.g., sent from a relay station for cellular phones). The wireless signal represents a call arrival sound, received sound, music, voice, image, video or the like.

When the antenna 543 receives a wireless signal, the signal output section 581 outputs a selection signal C1 representing a call arrival and a call arrival sound signal representing a call arrival sound in order to inform the user of the call arrival. By the selection signal C1, the selection section 85 selects the second electric signal/acoustic signal conversion section 84 and supplies the output call arrival sound signal to the second electric signal/acoustic signal conversion section 84. The call arrival sound signal may be a signal representing a pre-set calling sound or an audio signal obtained by data distribution or the like. The second electric signal/acoustic signal conversion section 84 reproduces the call arrival sound when receiving the call arrival sound signal. When the user learns of the call arrival and puts the mobile terminal device 2000 into a call receivable state, the signal output section 581 outputs the selection signal C1 again. The selection section 85 selects the first electric signal/acoustic signal conversion section 83 and supplies a "received sound signal" representing a received sound (voice of the caller), which is output from the signal output section 581, to the first electric signal/acoustic signal conversion section 83. The first electric signal/acoustic signal conversion section 83 reproduces the received sound when supplied with the received sound signal.

As described above, the speaker 1300 acts as an electric signal/acoustic signal conversion device having two functions of (i) a receiver and (ii) a loudspeaker by selectively sending a call arrival sound signal or a received sound signal, which is output from the signal output section 581, to one of the two electric signal/acoustic signal conversion sections 83 and 84 using the selection section 85.

In the above description, the electric signal applied to the second electric signal/acoustic signal conversion section 84 is a call arrival sound signal. The electric signal applied to the second electric signal/acoustic signal conversion section 84 may also be a received sound signal, a music signal representing music, or a voice signal representing a voice. In this case, for example, a music signal obtained by music distribution can be reproduced. The second electric signal/acoustic signal conversion section 84 may be structured to reproduce a received sound signal. In this case, the user can converse with the caller in a hands free mode without contacting his/her ear to the mobile terminal device 2000.

In this example, a received sound signal is described as a signal transmitted during a telephone call, and a voice signal is described as a signal representing a voice obtained by data distribution, which is not a received sound signal. Alternatively, a received sound signal may be considered as a type of voice signal.

In the mobile terminal device 2000, the electric signal applied to the speaker 1300 is directly output from the signal output section 581, but a call arrival sound signal may be output from a call arrival sound signal output section (not shown) separately provided from the signal output section 581. The call arrival sound signal output section stores a music signal and a voice signal obtained by data distribution or the like and outputs each of them as a call arrival sound signal.

In the mobile terminal device 2000, one selection section 85 selects one of the two signal passages to send a signal to the first electric signal/acoustic signal conversion section 83 or the second electric signal/acoustic signal conversion section 84. Alternatively, separate signal passages from the antenna 543 to the first and second electric signal/acoustic signal conversion sections 83 and 84 may be provided.

EXAMPLE 6

Figure 11A:
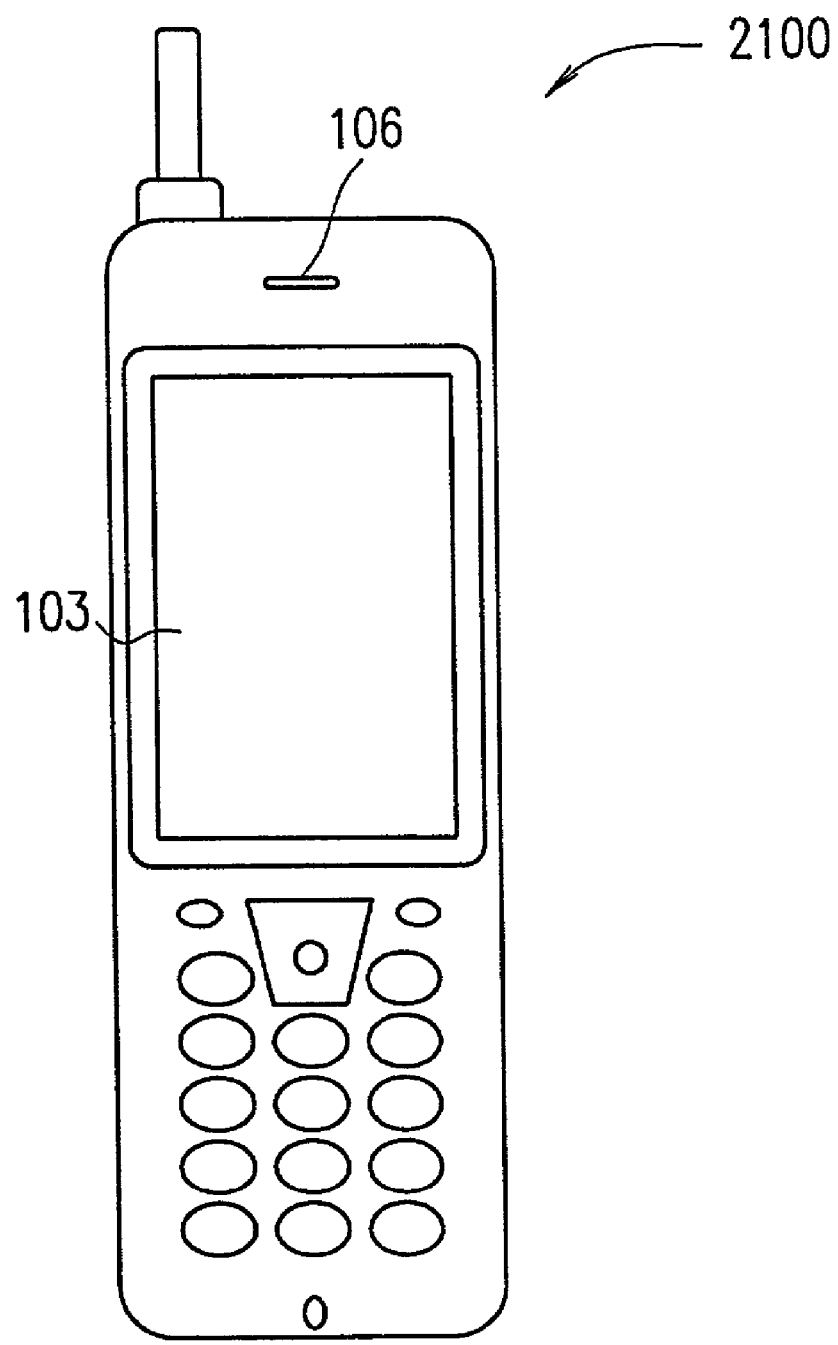
FIG. 11A is a is a plan view of a mobile terminal device according to a sixth example of the present invention.
Figure 11B:
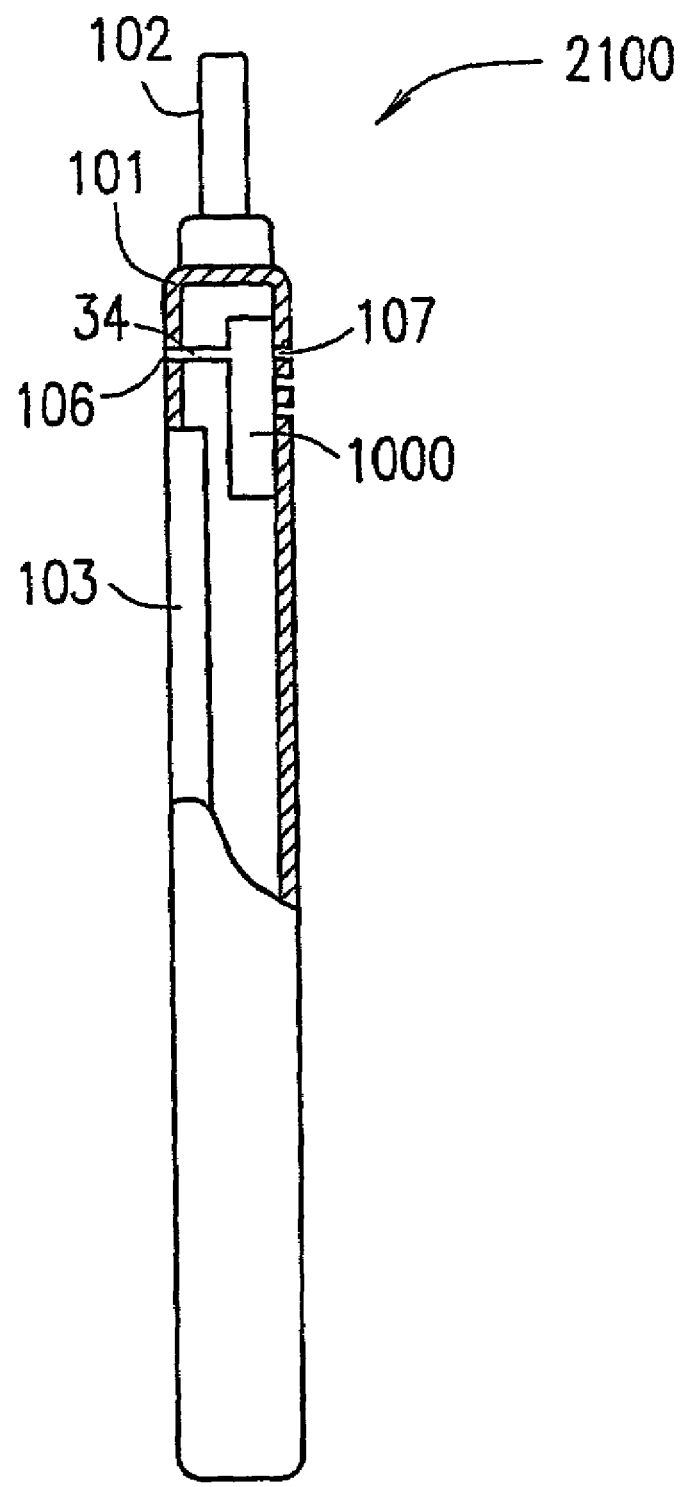
FIG. 11B is a partially cut side view of the mobile terminal device shown in FIG. 11A.
Figure 11C:
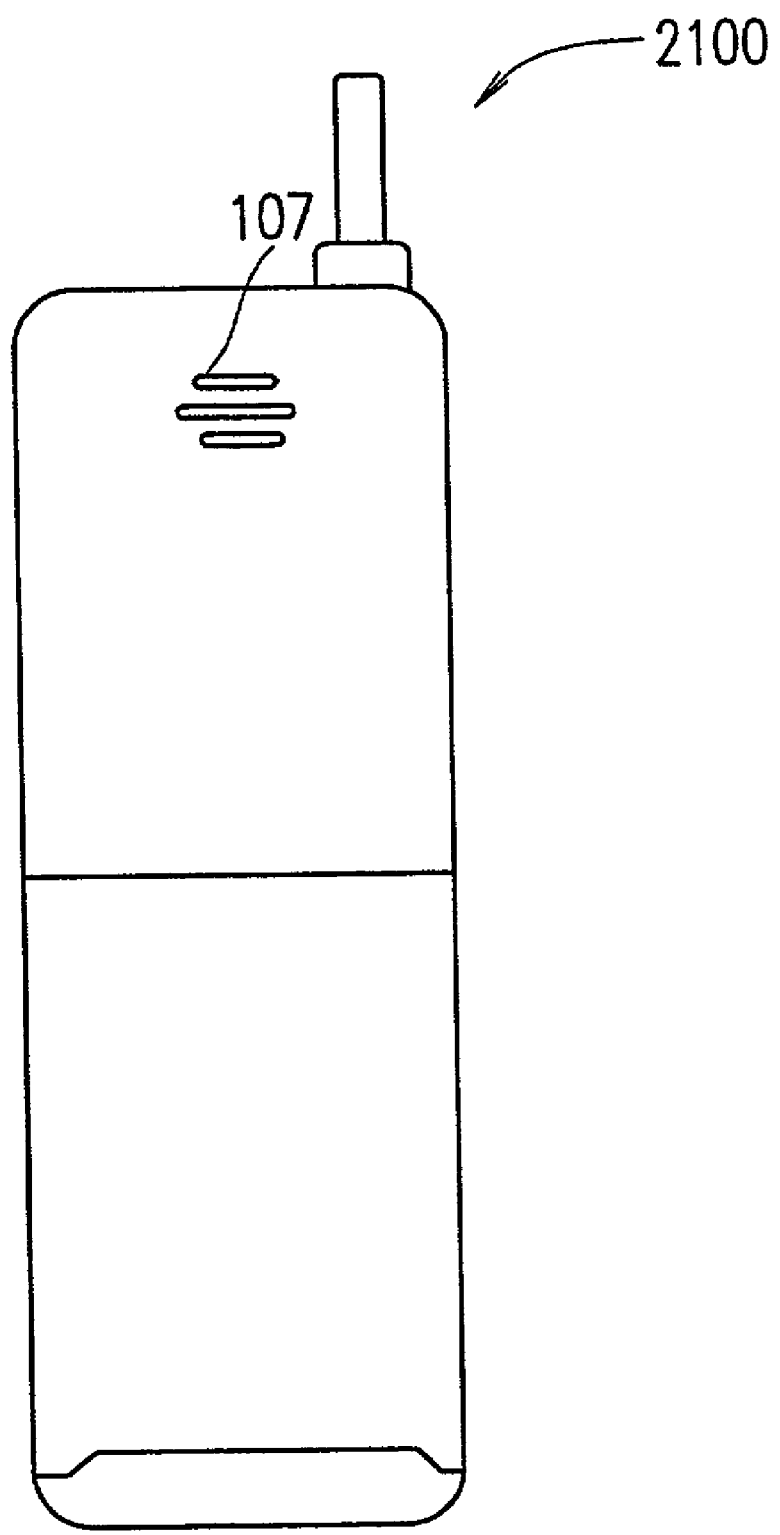
FIG. 11C is a rear view of the mobile terminal device shown in FIG. 11A.

A mobile terminal device 2100 according to a sixth example of the present invention will be described with reference to FIGS. 11A, 11B and 11C. FIG. 11A is a plan view of the mobile terminal device 2100, FIG. 11B is a partially cut side view thereof, and FIG. 11C is a rear view thereof.

In this example, the mobile terminal device 2100 is described as a cellular phone, but the mobile terminal device 2100 is not limited to a cellular phone.

The mobile terminal device 2100 includes a casing 101, a display section 103 provided in the casing 101, a receiving antenna 102 attached to the casing 101, and the speaker 1000 (FIGS. 1A and 1B) described in the first example The casing 101 includes a first sound hole 106 and a second sound hole 107. The casing 101 accommodates a connector and electric circuits including a receiving circuit (not shown).

The speaker 1000 is provided in the casing 101 so that the opening 36 of the acoustic pipe 34 faces the first sound hole 106 and the second diaphragm 30 faces the second sound hole 107. At least a portion of the speaker 1000 is provided between the display section 103 and a bottom surface of the casing 101. The speaker 1000 may be replaced with any of the speakers 1100, 1200 and 1300 in the second, third and fourth examples with an appropriate arrangement of the acoustic pipe 34.

An exemplary operation of the mobile terminal device 2100 will be described. The operation of the speaker 1000 is described above.

An electric signal representing a received sound is applied to the first voice coil 27 connected to the first diaphragm 29 of the speaker 1000. Thus, the received sound reproduced by the first diaphragm 29 is output through the first sound hole 106. In this case, the speaker 1000 acts as a receiver for reproducing the received sound.

An electric signal representing a call arrival sound, music, voice or the like is applied to the second voice coil 28 connected to the second diaphragm 30 of the speaker 1000. Thus, the call arrival sound, music, voice or the like generated by the second diaphragm 30 is output through the second sound hole 107. In this case, the speaker 1000 acts as a loudspeaker for reproducing the call arrival sound, music, voice or the like.

The throat 35 of the acoustic pipe 34 is provided at a location off the center of the first diaphragm 29. The acoustic pipe 34 extends so that the opening 36 is in the vicinity of the first sound hole 106. The throat 35 may be provided outside the outer peripheral edge of the first voice coil 27. The throat 35 maybe provided in the frame 31. Since the speaker 1000 includes the acoustic pipe 34, it is not necessary to provide the magnetic circuit of the speaker 1000 so as to face the first sound hole 106 in the casing 101. The magnetic circuit of the speaker 1000 can be provided between the display section 103 and the bottom surface of the casing 101. This allows the speaker 1000 to be provided in the casing 101 even when the speaker 1000 is relatively large. Since the acoustic pipe 34 projects from the space 33, the distance between the magnetic circuit of the speaker 1000 and the opening 36 of the acoustic pipe 34 can be extended, so that a space can be formed between the magnetic circuit of the speaker 1000 and the opening 36. Since the throat 35 of the acoustic pipe 34 is located off the center of the first diaphragm 29, the space can be formed more efficiently. The space can accommodate the display section 103 and electric circuits including a receiving circuit.

In a conventional mobile terminal device, a speaker needs to be provided so as to face the sound hole adjacent to the display section. Since the space for the speaker is thus limited, it is unavoidable to use a small-size speaker. According to the present invention, a larger speaker having improved acoustic characteristics is usable than in the conventional mobile terminal device. Also according to the present invention, it is not necessary to provide the speaker adjacent to the display section. This eliminates the size limitation of the display section imposed by the position of the speaker and allows the display section to be enlarged.

The speaker 1000 included in the mobile terminal device 2100 is a dynamic speaker using voice coils for electric signal to acoustic signal conversion. Alternatively, an magneto-electric speaker using magneto-electric absorption, a piezoelectric speaker, an electrostatic speaker or the like can be used. Substantially the same effect as above is obtained by providing the acoustic pipe.

Next, the operation of the mobile terminal device 2100 will be further described with reference to FIG. 12. FIG. 12 is a block diagram illustrating an internal structure of the mobile terminal device 2100.

The mobile terminal device 2100 including the speaker 1000 further includes a signal output section 581 for outputting an electric signal based on a wireless signal received by the antenna 102, and a selection section 85 for selecting whether the electric signal is to be output to the first voice coil 27 or the second voice coil 28. The speaker 1000 includes a first electric signal/acoustic signal conversion section 123, which includes the first diaphragm 29, the first voice coil 27 and the magnetic circuit. The speaker 1000 also includes a second electric signal/acoustic signal conversion section 124, which includes the second diaphragm 30, the first voice coil 28 and the magnetic circuit. The magnetic circuit of the speaker 1000 includes the first magnet 20, the second magnet 21, the first magnetic plate 23, the second magnetic plate 24, and the yoke 22 as shown in FIG. 1B, and is shared by the first and second electric signal/acoustic signal conversion sections 123 and 124.

The antenna 102 receives a wireless signal which is externally sent (e.g., sent from a relay station for cellular phones). The wireless signal represents a call arrival sound, received sound, music, voice, image, video or the like.

When the antenna 102 receives a wireless signal, the signal output section 581 outputs a selection signal C1 representing a call arrival and a call arrival sound signal representing a call arrival sound in order to inform the user of the call arrival. By the selection signal C1, the selection section 85 selects the second electric signal/acoustic signal conversion section 124 and supplies the output call arrival sound signal to the second electric signal/acoustic signal conversion section 124. The call arrival sound signal may be a signal representing a pre-set calling sound or an audio signal obtained by data distribution or the like. The second electric signal/acoustic signal conversion section 124 reproduces the call arrival sound when receiving the call arrival sound signal. When the user learns of the call arrival and puts the mobile terminal device 2100 into a call receivable state, the signal output section 581 outputs the selection signal C1 again. The selection section 85 selects the first electric signal/acoustic signal conversion section 123 and supplies a received sound signal representing a received sound, which is output from the signal output section 581, to the first electric signal/acoustic signal conversion section 123. The first electric signal/acoustic signal conversion section 123 reproduces the received sound when supplied with the received sound signal. The received sound reproduced by the first diaphragm 29 of the first electric signal/acoustic signal conversion section 123 is transmitted through the acoustic pipe 34 and is output through the first sound hole 106.

As described above, the speaker 1000 acts as an electric signal/acoustic signal conversion device having two functions of (i) a receiver, and (ii) a loudspeaker by selectively sending a call arrival sound signal or a received sound signal, which is output from the signal output section 581, to one of the two electric signal/acoustic signal conversion sections 123 and 124 using the selection section 85.

In the above description, the electric signal applied to the second electric signal/acoustic signal conversion section 124 is a call arrival sound signal. The electric signal may be a received sound signal, a music signal representing music, or a voice signal representing a voice. In this case, for example, a music signal obtained by music distribution can be reproduced. The second electric signal/acoustic signal conversion section 124 may be structured to reproduce a received sound signal. In this case, the user can converse with the caller in a hands free mode without contacting his/her ear to the mobile terminal device 2100.

In the mobile terminal device 2100, the electric signal applied to the speaker 1000 is directly output from the signal output section 581, but a call arrival sound signal may be output from a call arrival sound signal output section (not shown) separately provided from the signal output section 581. The call arrival sound signal output section stores a music signal and a voice signal obtained by data distribution or the like and outputs each of them as a call arrival sound signal.

In the mobile terminal device 2100, one selection section 85 selects one of the two signal passages to send a signal to the first electric signal/acoustic signal conversion section 123 or the second electric signal/acoustic signal conversion section 124. Alternatively, separate signal passages from the antenna 102 to the first and second electric signal/acoustic signal conversion sections 123 and 124 may be provided.

EXAMPLE 7

Figure 13A:
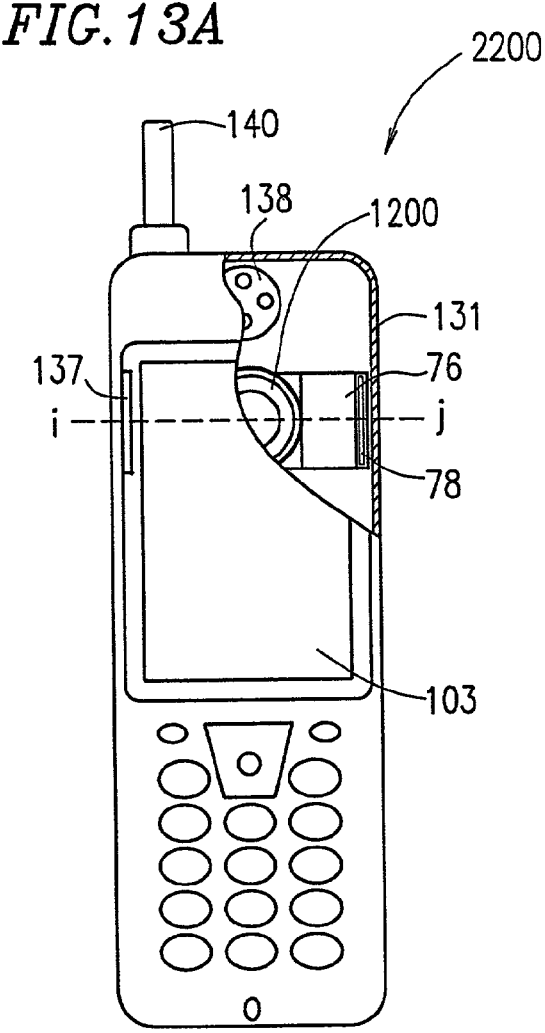
FIG. 13A is a partially cut plan view of a mobile terminal device according to a seventh example of the present invention.
Figure 13B:
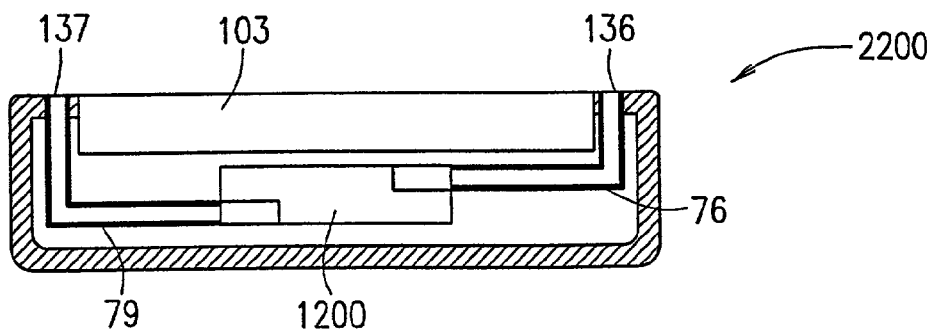
FIG. 13B is a cross-sectional view of the mobile terminal device shown in FIG. 13A taken along dashed line i–j in FIG. 13A.

A mobile terminal device 2200 according to a seventh example of the present invention will be described with reference to FIGS. 13A and 13B. FIG. 13A is a plan view of the mobile terminal device 2200, and FIG. 13B is a cross-sectional view of the mobile terminal device 2200 taken along line i–j in FIG. 13A.

In this example, the mobile terminal device 2200 is described as a cellular phone, but the mobile terminal device 2200 is not limited to a cellular phone.

The mobile terminal device 2200 includes a casing 131, a polygonal display section 103 provided in the casing 131, a receiving antenna 140 attached to the casing 131, the speaker 1200 (FIGS. 3A and 3B) described in the third example, and a speaker 138 acting as a receiver. The casing 131 includes a quadrangular first sound hole 136 and a quadrangular second sound hole 137. The casing 131 accommodates a connector and electric circuits including a receiving circuit (not shown). The first sound hole 136 and the second sound hole 137 each have longitudinal sides which are parallel to one of peripheral sides of the display section.

The speaker 1200 is provided in the casing 131 so that the opening 78 of the first acoustic pipe 76 faces the first sound hole 136 and the opening 81 of the second acoustic pipe 79 faces the second sound hole 137. The opening 78 of the first acoustic pipe 76 may be connected to the first sound hole 136, and the opening 81 of the second acoustic pipe 79 may be connected to the second sound hole 137. At least a portion of the speaker 1200 is provided between the display section 103 and a bottom surface of the casing 131. The speaker 1200 may be replaced with any of the speakers 1000, 1100 and 1300 in the first, second and fourth examples with an appropriate arrangement of the acoustic pipes 76 and 79.

An exemplary operation of the mobile terminal device 2200 will be described. The operation of the speaker 1200 is described above.

The mobile terminal device 2200 includes the speaker 138 acting as a receiver. A received sound is reproduced by the speaker 138 as in a conventional mobile terminal device. In the mobile terminal device 2200, an electric signal representing a call arrival sound, music, voice or the like is applied to the speaker 1200. Thus, the call arrival sound, music, voice or the like is output through the first sound hole 136 and the second sound hole 137. In this case, the speaker 1200 acts as a loudspeaker for reproducing the call arrival sound, music, voice or the like.

As described in the third example, the first magnetic gaps 67 and 68 have the same size, the first and second voice coils 69 and 70 have the same size, and the first and second diaphragms 71 and 72 have the same size. Such an arrangement allows sounds output from the first sound hole 136 and the second sound hole 137 to have substantially the same acoustic characteristics. In the case where the same electric signal is applied to the first voice coil 69 and the second voice coil 70, the sound pressure can be raised by, for example, about 3 dB than a conventional speaker having one diaphragm with the same power consumption. Moreover, the speaker 1200 can reproduce audio signals of a plurality of channels. For example, for reproducing an audio signal representing a stereo signal, a music signal for the right channel can be applied to the first voice coil 69 and a music signal for the left channel can be applied to the second voice coil 70. Then, stereo music is reproduced from the first sound hole 136 and the second sound hole 137.

The first and second acoustic pipes 76 and 79 extend in a direction substantially perpendicular to the direction in which the first and second diaphragms vibrate. Therefore, the speaker 1200 can be thin. Even when the speaker 1200 is located between the display section 132 and the bottom surface of the casing 131, the thickness of the mobile terminal device 2200 does not need to be increased. The mobile terminal device 2200, which is thin and reproduces high quality stereo sound at a high volume, is realized.

The speaker 1200 included in the mobile terminal device 2200 is a dynamic speaker using voice coils for electric signal to acoustic signal conversion. Alternatively, an magneto-electric speaker using magneto-electric absorption, a piezoelectric speaker, an electrostatic speaker or the like can be used. Substantially the same effect as above is obtained by providing the acoustic pipe.

Figure 14:
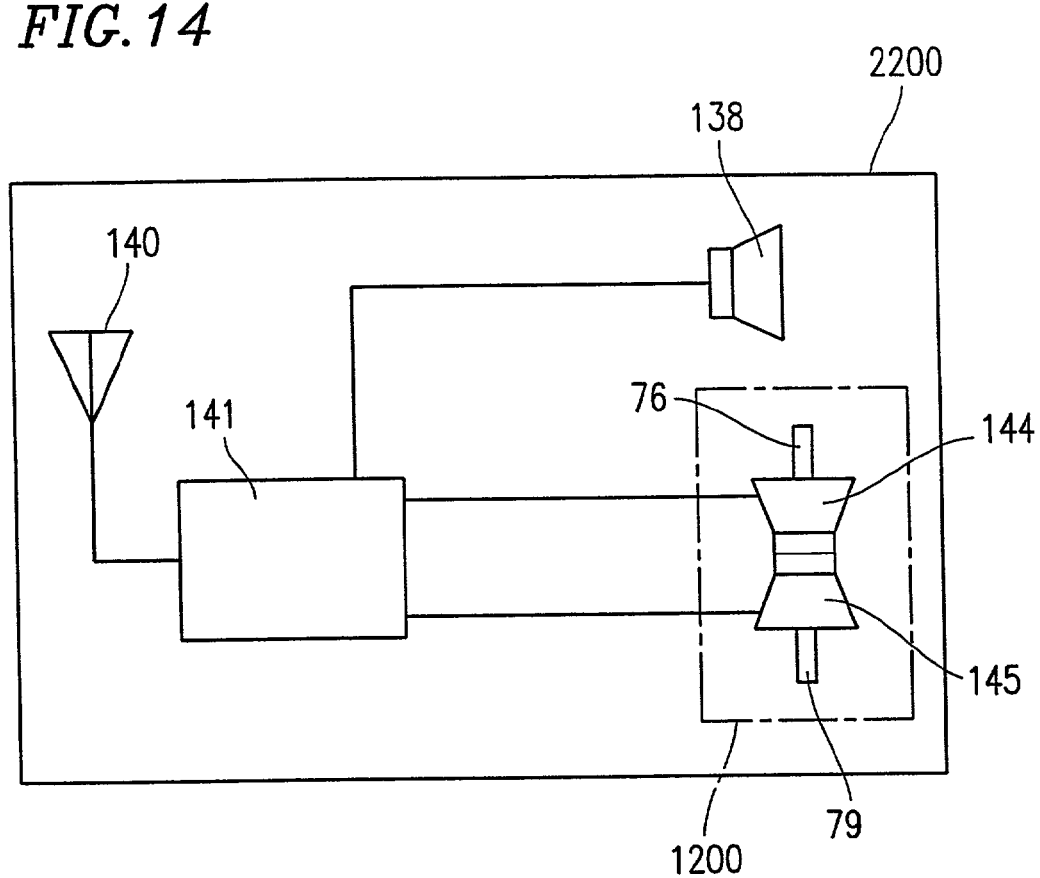
FIG. 14 is a block diagram illustrating an internal structure of the mobile terminal device shown in FIGS. 13A and 13B.

Next, the operation of the mobile terminal device 2200 will be further described with reference to FIG. 14. FIG. 14 is a block diagram illustrating an internal structure of the mobile terminal device 2200.

The mobile terminal device 2200 including the speaker 1200 further includes a signal output section 141 for outputting an electric signal to the first voice coil 69 and the second voice coil 70 based on a wireless signal received by the antenna 140. The speaker 1200 includes a first electric signal/acoustic signal conversion section 144, which includes the first diaphragm 71, the first voice coil 69 and the magnetic circuit. The speaker 1200 also includes a second electric signal/acoustic signal conversion section 145, which includes the second diaphragm 72, the second voice coil 70 and the magnetic circuit. The magnetic circuit of the speaker 1200 includes the magnet 60, the first magnetic plate 61, the second magnetic plate 62, and the yoke 63 as shown in FIG. 3B, and is shared by the first and second electric signal/acoustic signal conversion sections 144 and 145.

The antenna 140 receives a wireless signal which is externally sent (e.g., sent from a relay station for cellular phones). The wireless signal represents a call arrival sound, received sound, music, voice, image, video or the like.

When the antenna 140 receives a wireless signal, the signal output section 141 outputs a call arrival sound signal representing a call arrival sound to the first electric signal/acoustic signal conversion section 144 and the second electric signal/acoustic signal conversion section 145 in order to inform the user of the call arrival. The call arrival sound signal may be a signal representing a pre-set calling sound or an audio signal obtained by data distribution or the like. The first electric signal/acoustic signal conversion section 144 and the second electric signal/acoustic signal conversion section 145 reproduce the call arrival sound when receiving the call arrival sound signal. In the case where the call arrival sound signal is a stereo signal, a stereo call arrival sound is reproduced from the speaker 1200. When the user puts the mobile terminal device 2200 into a call receivable state, the signal output section 141 stops outputting the call arrival sound signal to the first and second electric signal/acoustic signal conversion sections 144 and 145. Simultaneously, the signal output section 141 outputs a received sound signal representing a received sound to the speaker 138. The speaker 138 reproduces the received sound when receiving the received sound signal.

In the above description, the electric signal applied to the speaker 1200 is a call arrival sound signal. The electric signal may be a received sound signal, a music signal representing music, or a voice signal representing a voice. In this case, for example, a music signal obtained by music distribution can be reproduced. The speaker 1200 may be structured to reproduce a received sound signal. In this case, a loud reproduction sound is obtained from both the first diaphragm 71 and the second diaphragm 72. Thus, the user can converse with the caller in a hands free mode without contacting his/her ear to the mobile terminal device 2200 even in a noisy environment.

In the mobile terminal device 2200, the electric signal applied to the speaker 1200 is directly output from the signal output section 141, but a call arrival sound signal may be output from a call arrival sound signal output section (not shown) separately provided from the signal output section 141. The call arrival sound signal output section stores a music signal and a voice signal obtained by data distribution or the like and outputs each of them as a call arrival sound signal.

EXAMPLE 8

Figure 15:
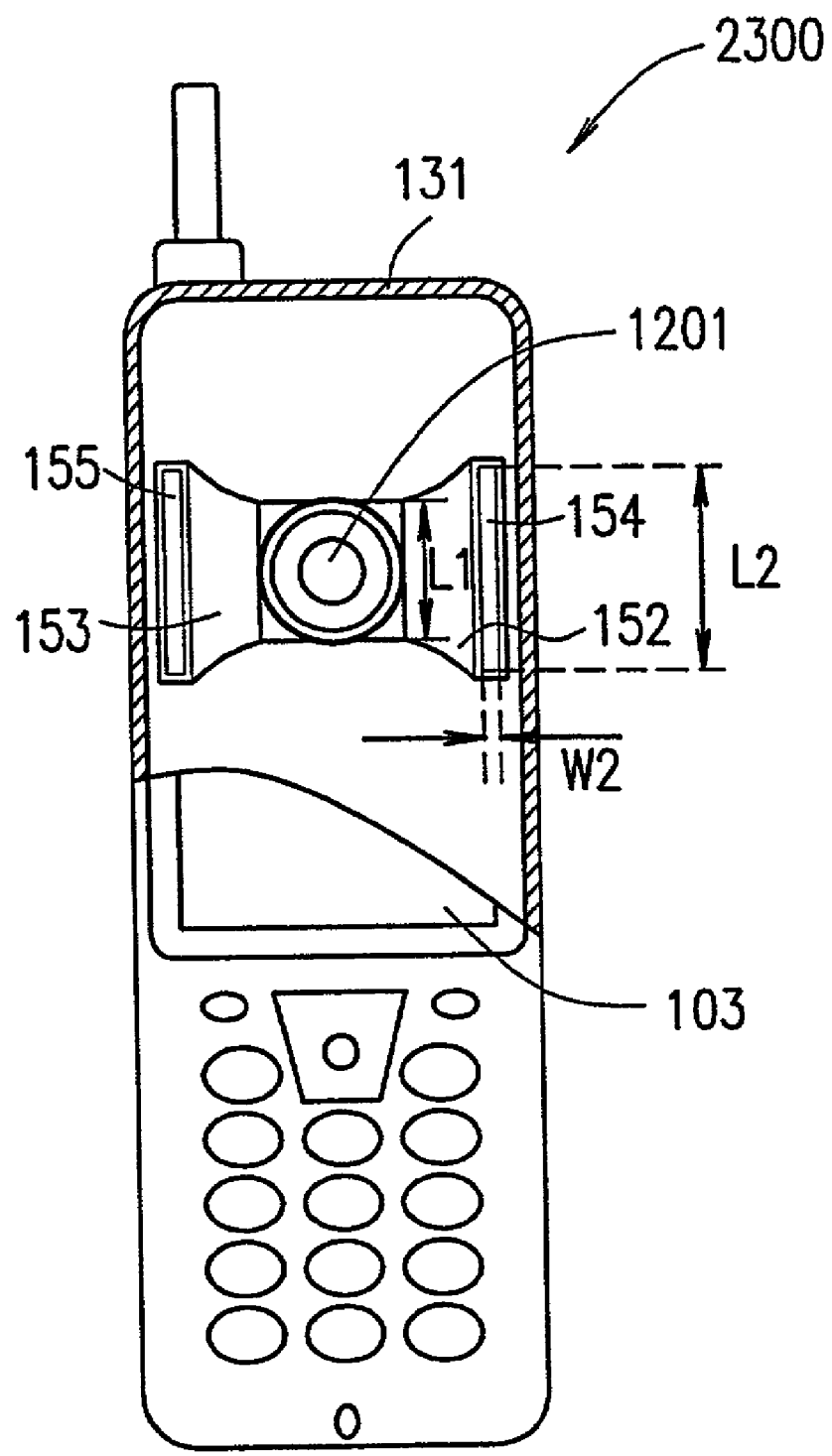
FIG. 15 is a partially cut plan view of a mobile terminal device according to an eighth example of the present invention.

A mobile terminal device 2300 according to an eighth example of the present invention will be described with reference to FIG. 15. The mobile terminal device 2300 is modified from the mobile terminal device 2200 shown in FIGS. 13A and 13B. The mobile terminal device 2300 includes a speaker 1201 instead of the speaker 1200. The other elements of the mobile terminal device 2300 are substantially the same as those of the mobile terminal device 2200. FIG. 15 is a partially cut plan view of the mobile terminal device 2300. FIG. 15 is provided for illustrating how the speaker 1201 is provided in the casing 131.

In this example, the mobile terminal device 2300 is described as a cellular phone, but the mobile terminal device 2300 is not limited to a cellular phone.

The speaker 1201 includes a first acoustic pipe 152 and a second acoustic pipe 153 instead of the first acoustic pipe 76 and the second acoustic pipe 79 of the speaker 1200 shown in FIGS. 3A and 3B. The speaker 1201 has substantially the same structure as that of the speaker 1200 except for this point. The speaker 1201 may be replaced with any of the speakers 1000, 1100 and 1300 in the first, second and fourth examples with an appropriate arrangement of the first acoustic pipe 152 and the second acoustic pipe 153.

The first acoustic pipe 152 and the second acoustic pipe 153 are located in side portions of the speaker 1201. The sound transmitted through the first acoustic pipe 152 is output through a first opening 154, and the sound transmitted through the second acoustic pipe 153 is output through a second opening 155. The cross-sectional area of each of the first and second acoustic pipes 152 and 153 gradually increases from the center to the side of the speaker 1201. In this specification, such a shape of the acoustic pipe is referred to as a "horn shape". Although not shown here, the speaker 1201 includes a display section located between the first and second openings 154 and 155.

An exemplary operation of the mobile terminal device 2300 will be described. A basic operation of the speaker 1201 is the same as that of the speaker 1200.

As described above, the first and second acoustic pipes 76 and 79 of the speaker 1200 each have a straight shape with the cross-sectional area being constant in a longitudinal or vertical direction thereof (FIG. 1B). By contrast, the first and second acoustic pipes 152 and 153 of the speaker 1201 each have a horn shape with the cross-sectional area gradually increasing from the center to the side of the speaker 1201 (FIG. 15). Owing to such a shape, the first and second acoustic pipes 152 and 153 can have a larger capacity than the first and second acoustic pipes 76 and 79 of the speaker 1200, but alleviate the acoustic load applied on the first and second diaphragms 71 and 72. As a result, the sound pressure level of the sound output through each of the first and second openings 154 and 155 can be raised.

A width W2 of the first and second openings 154 and 155 of the speaker 1201 (FIG. 15) can be substantially equal to a width W1 (FIG. 3A) of the first and second openings 78 and 81. A length L2 of the first and second openings 154 and 155 of the speaker 1201 is gradually increased from a length L1 which is equal to the length of the first and second openings 78 and 81.

An acoustic pipe including an opening having such a lengthy shape according to the present invention has the following effect. In a direction parallel to the longer sides of the opening, the directivity is high due to a large sound source length. In a direction parallel to the shorter sides of the opening, the directivity is low due to a small sound source length. As a result, the sound output in a particular direction can be strengthened or weakened. For example, in the case of the mobile terminal device 2300 shown in FIG. 15, the length L2 is longer than the width W2. The directivity is low in the direction parallel to the sides having the width W2. When a plurality of people listen to the music reproduced by the mobile terminal device 2300, listeners can listen to the music with substantially the same quality regardless of the position in the direction parallel to the sides having the width W2. In the direction parallel to the sides having the length L2, the directivity is high. Therefore, listeners listen to the music with different energy levels depending on the position in the direction parallel to the sides having the width L2. Thus, the mobile terminal device 2300 can strengthen or weaken the energy level of the sound output in a particular direction.

EXAMPLE 9

Figure 16A:
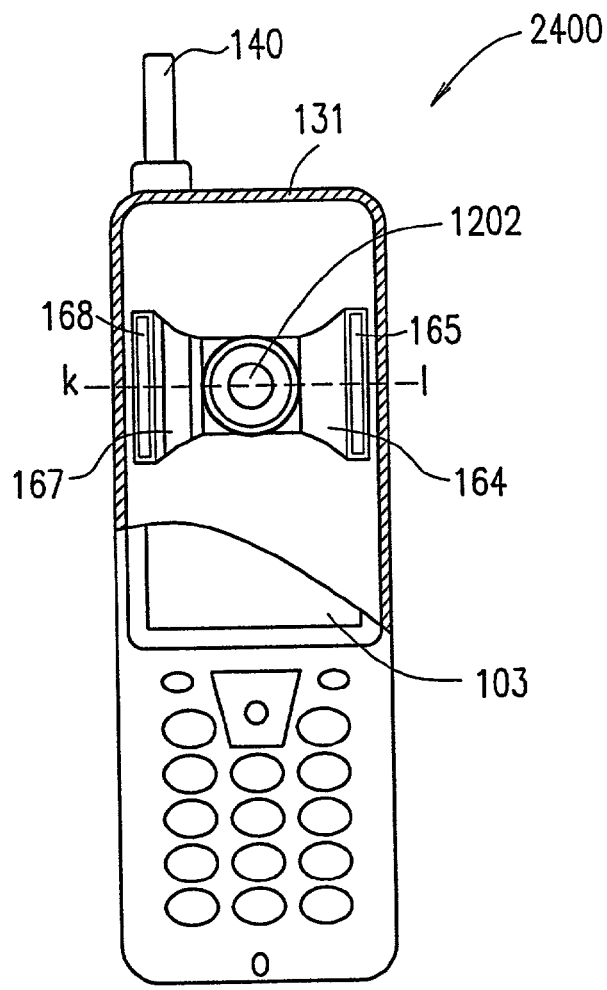
FIG. 16A is a partially cut plan view of a mobile terminal device according to a ninth example of the present invention.
Figure 16B:
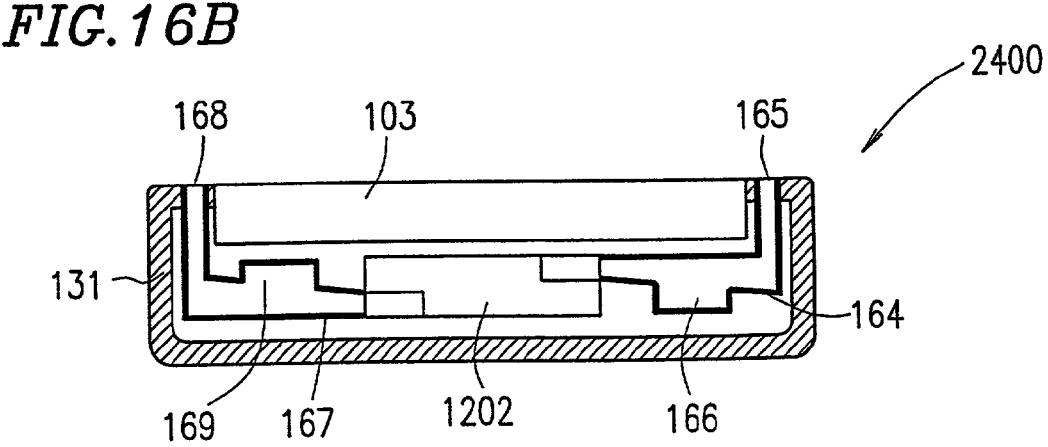
FIG. 16B is a cross-sectional view of the mobile terminal device shown in FIG. 16A taken along dashed line k–l in FIG. 16A.

A mobile terminal device 2400 according to a ninth example of the present invention will be described with reference to FIGS. 16A and 16B. The mobile terminal device 2400 is modified from the mobile terminal device 2300 shown in FIG. 15. The mobile terminal device 2400 includes a speaker 1202 instead of the speaker 1201. The other elements of the mobile terminal device 2400 are substantially the same as those of the mobile terminal device 2300. FIG. 16A is a partially cut plan view of the mobile terminal device 2400, and FIG. 16B is a cross-sectional view of the mobile terminal device 2300 taken along dashed line k–l in FIG. 16A.

In this example, the mobile terminal device 2400 is described as a cellular phone, but the mobile terminal device 2400 is not limited to a cellular phone.

The speaker 1202 includes a first acoustic pipe 164 and a second acoustic pipe 167 instead of the first acoustic pipe 152 and the second acoustic pipe 153 of the speaker 1201 shown in FIG. 15. The speaker 1202 has substantially the same structure as that of the speaker 1201 except for this point. The speaker 1202 may be replaced with any of the speakers 1000, 1100 and 1300 in the first, second and fourth examples with an appropriate arrangement of the first acoustic pipe 164 and the second acoustic pipe 167.

The first acoustic pipe 164 and the second acoustic pipe 167 are horn-shaped, and located in side portions of the speaker 1202. The sound transmitted through the first acoustic pipe 164 is output through a first opening 165, and the sound transmitted through the second acoustic pipe 167 is output through a second opening 168. As shown in FIG. 16B, the first acoustic pipe 164 has a first air volume section 166. The first air volume section 166 has a cross-sectional area larger than that of the portions of the first acoustic pipe 164 adjacent to the first air volume section 166. The second acoustic pipe 167 has a second air volume section 169. The second air volume section 169 has a cross-sectional area larger than that of the portions of the second acoustic pipe 167 adjacent to the second air volume section 169.

An exemplary operation of the mobile terminal device 2400 will be described. A basic operation of the speaker 1202 is the same as that of the speaker 1201.

As described above, the first acoustic pipe 164 has the first air volume section 166, and the second acoustic pipe 167 has the second air volume section 169. The first air volume section 166 acts as an air compliance component so as to operate as a high cut filter for cutting a high frequency component of the sound transmitted through the first acoustic pipe 164. The second air volume section 169 acts as an air compliance component so as to operate as a high cut filter for cutting a high frequency component of the sound transmitted through the second acoustic pipe 167. With the first and second air volume sections 166 and 169, a high frequency component equal to or higher than about 10 kHz, which is not specifically required for a mobile terminal device, is acoustically attenuated, and the resultant sound is output through the first and second openings 165 and 168. Therefore, the acoustic characteristics can be controlled without using a filter in the form of an electric circuit.

The first and second acoustic pipes 164 and 167 may be oriented horizontally or vertically using a space in the mobile terminal device 2400. Even when the first and second acoustic pipes 164 and 167 are straight-shaped, substantially the same effect is provided.

EXAMPLE 10

Figure 17A:
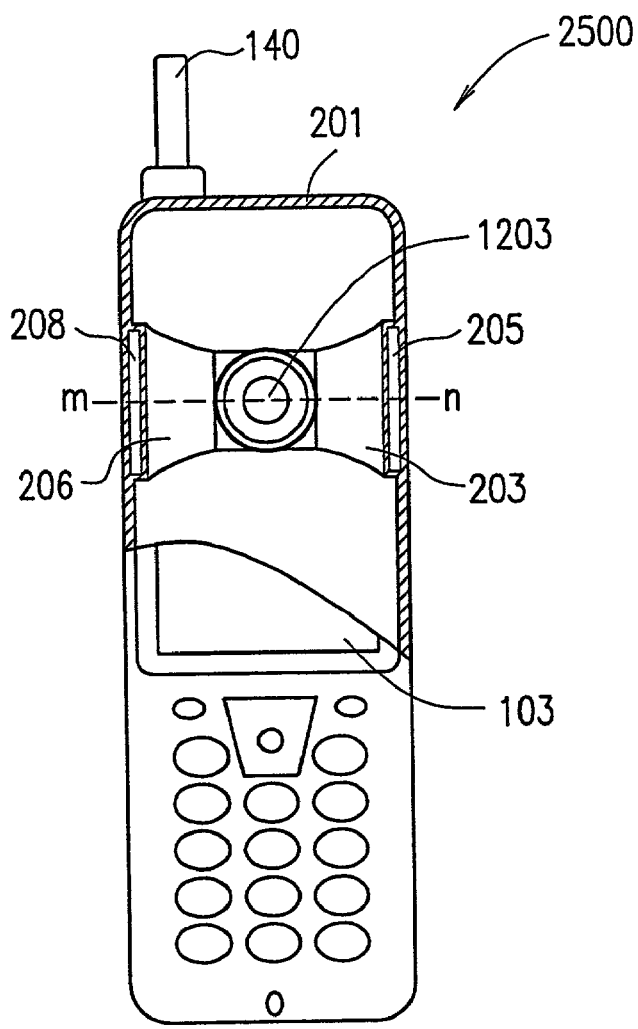
FIG. 17A is a partially cut plan view of a mobile terminal device according to a tenth example of the present invention.
Figure 17B:
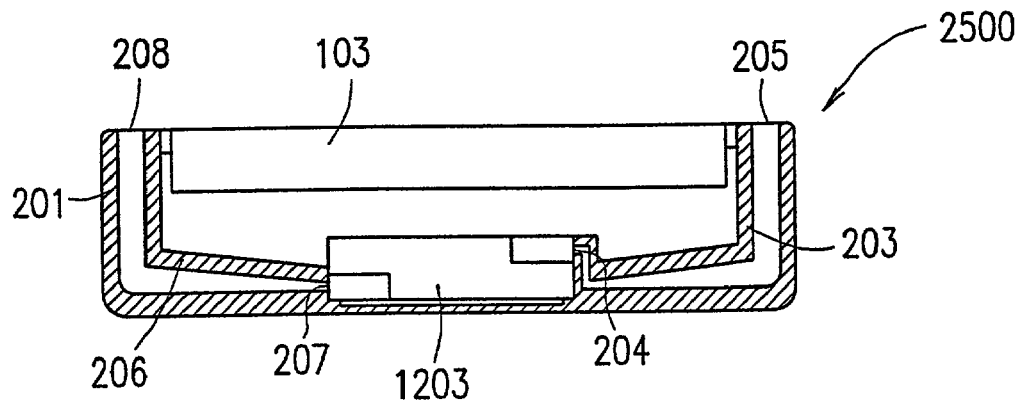
FIG. 17B is a cross-sectional view of the mobile terminal device shown in FIG. 17A taken along dashed line m–n in FIG. 17A.

A mobile terminal device 2500 according to a tenth example of the present invention will be described with reference to FIGS. 17A and 17B. The mobile terminal device 2500 is modified from the mobile terminal device 2300 shown in FIG. 15. The mobile terminal device 2500 includes a speaker 1203 instead of the speaker 1201, and includes a casing 201 instead of the casing 131. FIG. 17A is a partially cut plan view of the mobile terminal device 2500, and FIG. 17B is a cross-sectional view of the mobile terminal device 2500 taken along dashed line m–n in FIG. 17A.

In this example, the mobile terminal device 2500 is described as a cellular phone, but the mobile terminal device 2500 is not limited to a cellular phone.

The speaker 1203 does not include the first acoustic pipe 152 and the second acoustic pipe 153 included in the speaker 1201 shown in FIG. 15. The speaker 1203 has substantially the same structure as that of the speaker 1201 except for this point. The mobile terminal device 2500 includes a first acoustic pipe 203 and a second acoustic pipe 206 integrally formed therewith. The other elements of the mobile terminal device 2500 are substantially the same as those of the mobile terminal device 2300. The first acoustic pipe 203 includes a first throat 204 and a first opening 205. The second acoustic pipe 206 includes a second throat 207 and a second opening 208. The mobile terminal device 2500 has substantially the same structure as that of the mobile terminal device 2300 except for these points. The speaker 1203 may be replaced with any of the speakers 1000, 1100 and 1300 in the first, second and fourth examples with an appropriate arrangement of the first acoustic pipe 203 and the second acoustic pipe 206.

An exemplary operation of the mobile terminal device 2500 will be described. A basic operation of the speaker 1203 is the same as that of the speaker 1201.

As described above, the first acoustic pipe 203 and the second acoustic pipe 206 are integrally formed with the casing 201. Therefore, the speaker 1203 is of a separate unit from the first and second acoustic pipes 203 and 206. The speaker 1203 is provided in the mobile terminal device 2500 by connecting a sound outlet provided on a side surface of the frame of the speaker 1203 (for example, the first sound hole 37 and the second sound hole 38 when the speaker 1300 shown in FIG. 5B is used in the mobile terminal device 2500) to the first throat 204 and the second throat 207, respectively. Thus, the mobile terminal device 2500 can output the sound in substantially the same manner as the mobile terminal device 2300 shown in FIG. 15. The mobile terminal device 2500, in which the casing 201 also acts as the walls of the first and second acoustic pipes 203 and 206, can be further reduced in size. By integrally forming the first and second acoustic pipes 203 and 206 with the casing 201, the structure of the speaker 1203 can be simplified. This also contributes to size reduction of the mobile terminal device 2500.

The first and second acoustic pipes 203 and 206 are horn-shaped. Even when the first and second acoustic pipes 164 and 167 are straight-shaped, substantially the same effect is provided. The first and second acoustic pipes 203 and 206 may respectively have the first and second air volume sections 166 and 169 described in the ninth example.

Figure 18:
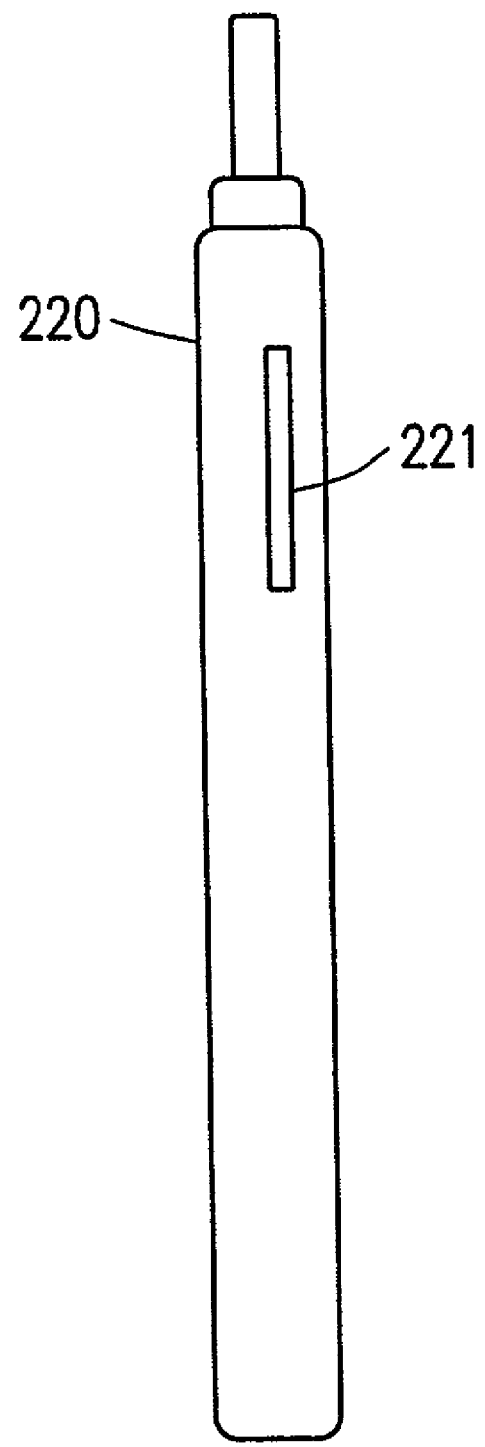
FIG. 18 is a side view of an alternative mobile terminal device according to the present invention.

In the sixth through tenth examples, two sound holes respectively corresponding to the openings of the two acoustic pipes are formed on side areas of the front surface of the mobile terminal device so as to interpose the display section. Alternatively, as shown in FIG. 18, sound hole 221 may be provided on each of two side surfaces of a casing 220. In this case, the width of the mobile terminal device can be smaller than the width of a mobile terminal device which has the sound holes on the front surface thereof interposing the display section.

Figure 19:
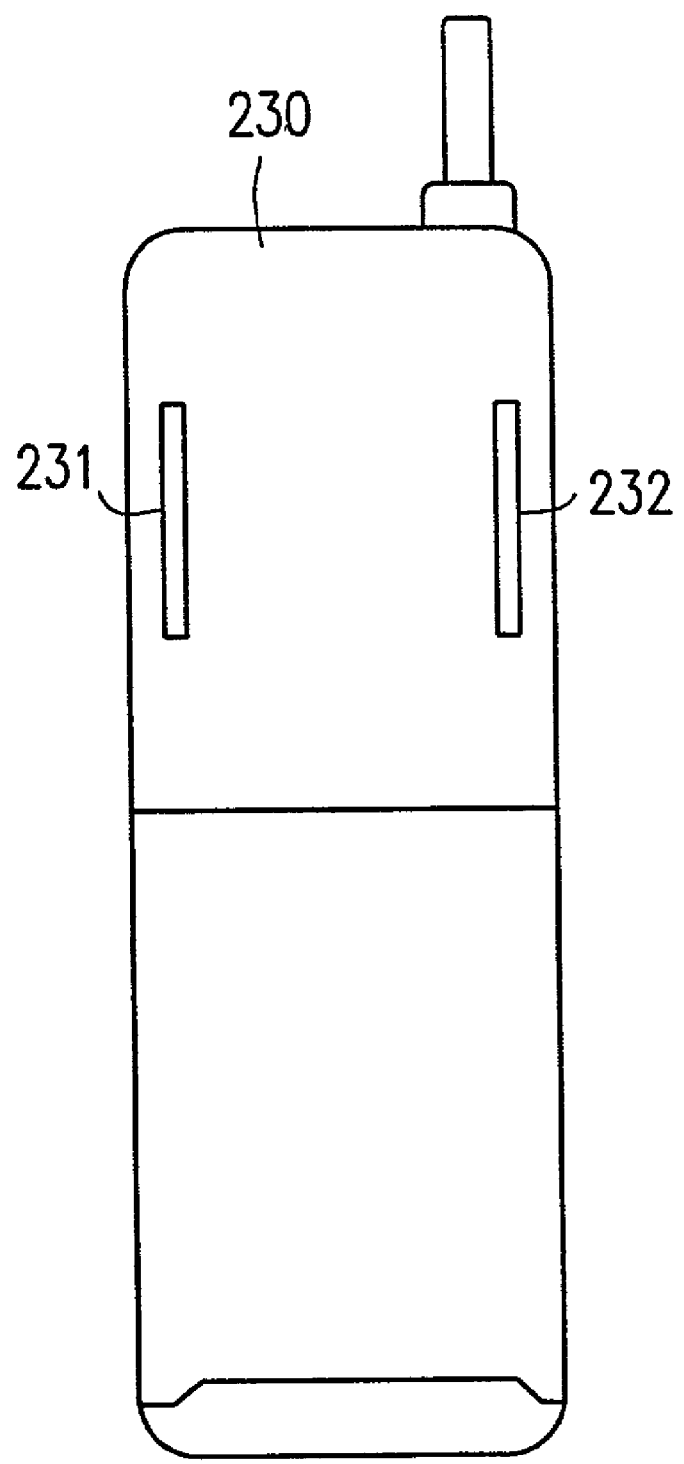
FIG. 19 is a rear view of an alternative mobile terminal device according to the present invention.

Still alternatively, as shown in FIG. 19, two sound holes 231 and 232 may be provided on a rear surface of the mobile terminal device. In this case also, the width of the mobile terminal device can be smaller than the width of a mobile terminal device which has the sound holes on the front surface thereof interposing the display section. According to the present invention, the sound generated by two diaphragms of the speaker can be output from the front surface and rear surface of the mobile terminal device, or from the front surface and side surfaces of the mobile terminal device.

Figure 20:
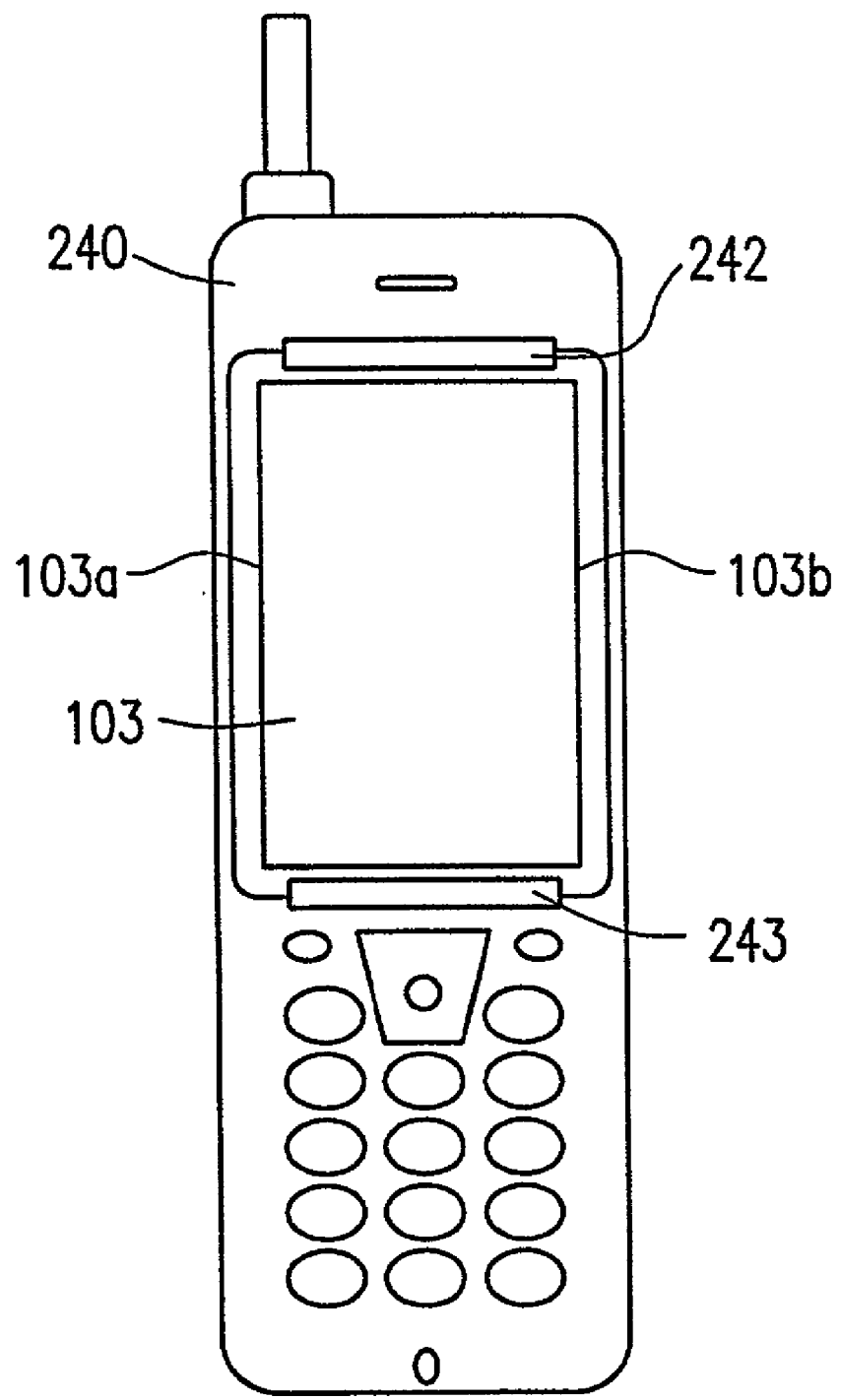
FIG. 20 is a front view of an alternative mobile terminal device according to the present invention.

As shown in FIG. 20, sound holes 242 and 243 may be provided above and below the display section 103, i.e., along two shorter sides of the display section 103. When a stereo signal is reproduced, the mobile terminal device having such a structure is inclined at 90 degrees from the state shown in FIG. 20. Since the distance between the sound holes 242 and 243 is longer than the distance between the sound holes provided along the longer sides of the display section 103, the stereo effect is improved. This enhances the acoustic effect obtained when audio signals of a plurality of channels are reproduced. Furthermore, when a live broadcast of a concert is received by the mobile terminal device, the video is reproduced with sides 103a and 103b being used as upper or lower sides of a screen. Namely, the video is reproduced in a screen which is longer in the horizontal direction than in the vertical direction like a TV screen. The arrangement of the sound holes 242 and 243 shown in FIG. 20 is advantages in such a case in that the direction of the video matches the direction of the reproduced sound field.

In the sixth through tenth examples, the speaker is provided closer to the rear surface of the mobile terminal device. The same effect is provided regardless of the position of the speaker in the mobile terminal device.

EXAMPLE 11

Figure 21:
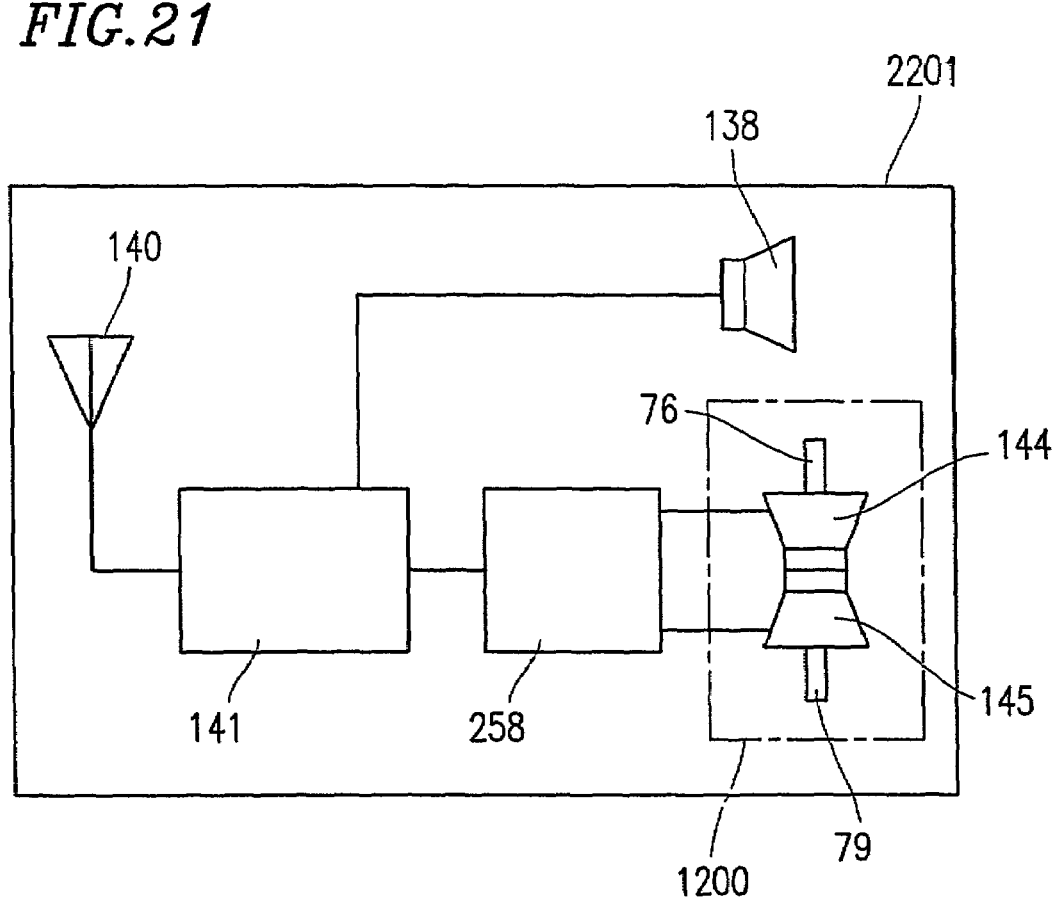
FIG. 21 is a block diagram illustrating an internal structure of a mobile terminal device according to an eleventh example according to the present invention.

A mobile terminal device 2201 according to an eleventh example of the present invention will be described with reference to FIG. 21. FIG. 21 is a block diagram illustrating an internal structure of the mobile terminal device 2201. The mobile terminal device 2201 is modified from the mobile terminal device 2200 shown in FIGS. 13A, 13B and 14. The mobile terminal device 2200 includes an acoustic image adjusting section 258 for adjusting an acoustic image of the sound reproduced by the speaker 1200, in addition to the elements included in the mobile terminal device 2200. The mobile terminal device 2201 has substantially the same structure as that of the mobile terminal device 2200 except for this point.

The antenna 140 receives a wireless signal which is externally sent (e.g., sent from a relay station for cellular phones). The wireless signal represents a call arrival sound, received sound, music, voice, image, video or the like.

When the antenna 140 receives a wireless signal, the signal output section 141 outputs a call arrival sound signal representing a call arrival sound to the acoustic image adjusting section 258 in order to inform the user of the call arrival. The acoustic image adjusting section 258 adjusts the call arrival sound signal so that the acoustic image of the sound reproduced by the speaker 1200 expands. The acoustic image adjusting section 258 outputs the resultant call arrival sound signal to the first electric signal/acoustic signal conversion section 144 and the second electric signal/acoustic signal conversion section 145. The call arrival sound signal may be a signal representing a pre-set calling sound or an audio signal obtained by data distribution or the like. The first electric signal/acoustic signal conversion section 144 and the second electric signal/acoustic signal conversion section 145 reproduce the call arrival sound when receiving the call arrival sound signal. Since the call arrival sound signal is adjusted so that the acoustic image expands, the call arrival sound output from the first and second acoustic pipes 76 and 79 sounds realistic. When the user puts the mobile terminal device 2201 into a call receivable state, the signal output section 141 stops outputting the call arrival sound signal to the acoustic image adjusting section 258. Simultaneously, the signal output section 141 outputs a received sound signal representing a received sound to the speaker 138. The speaker 138 reproduces the received sound when receiving the received sound signal.

In the above description, the electric signal applied to the speaker 1200 is a call arrival sound signal. The electric signal may be a received sound signal, a music signal representing music, or a voice signal representing a voice. In this case, the mobile terminal device 2201, although being compact in size, can reproduce, for example, a stereo music signal so that the user can perceive the expansion of sound comparable to music reproduced by a large-scale music reproduction apparatus. With audio signals of two or more channels, more realistic music close to that of a live performance can be obtained by adjusting the acoustic image adjusting section 258 of each channel.

A speaker having two magnetic gaps of different sizes (for example, the speaker 1000 in the first example and the speaker 1100 in the second example) each have two voice coils having different diameters and two diaphragms having different areas. By adjusting, for example, the shapes and materials of the voice coils and the diaphragms, the acoustic characteristics (efficiency, reproduction frequency band width, etc.) of the sounds reproduced by the two diaphragms can be equal to each other. In this manner, a speaker having different sizes of magnetic gaps, voice coils and diaphragms can provide a high quality reproduction of stereo audio signals.

According to the present invention, the frames and the diaphragms are not limited to being circular, but may be elliptical, polygonal or the like in accordance with the space in which the speaker is provided. The cross-section of the acoustic pipe from the throat to the opening may be circular, quadrangular, elliptical or any other appropriate shape.

In the above description, the speaker according to the present invention is used in a mobile terminal device. The speaker according to the present invention may be used in a game apparatus, a personal computer, an MD player or the like which does not include a signal receiving device. In this case, the speaker is used for reproducing a sound effect, a music signal, a voice signal or the like. In such a case, the speaker according to the present invention provides a compact device capable of reproducing audio information of a plurality of channels including a stereo signal, like the speaker provided in a mobile terminal device.

According to the present invention, a speaker is provided in which the yoke connects the first magnet and the second magnet to each other, the first voice coil is located between the first magnet and the yoke, and the second voice coil is located between the second magnet and the yoke. Owing to such a structure, the first voice coil is supplied with a magnetic flux mainly from the first magnet, and the second voice coil is supplied with a magnetic flux mainly from the second magnet. The two voice coils are driven by separate magnets. Therefore, a driving force generated in each voice coil can be increased, and thus a loud sound can be generated.

According to the present invention, a mobile terminal device including the above-described speaker is provided. Since the speaker according to the present invention can generate a loud sound, the mobile terminal device according to the present invention can generate a louder sound than a mobile terminal device including a conventional speaker having the same size as that of the speaker of the present invention. Since a louder sound can be generated, the size of the speaker can be reduced and thus can reduce the size of the space of the mobile terminal device occupied by the speaker.

According to the present invention, at least one of a first acoustic pipe provided between the first diaphragm and the first sound hole, and a second acoustic pipe provided between the second diaphragm and the second sound hole is provided. Owing to such a structure, the speaker in the mobile terminal device can be located with a high level of freedom.

According to the present invention, the magnetization direction of the first magnet and the magnetization direction of the second magnet may be opposite to each other. In this case, magnetic saturation in the yoke can be avoided. This causes a greater magnitude of magnetic flux to be provided to the first and second voice coils, and thus allows a louder sound to be generated.

According to the present invention, a speaker is provided, in which a magnet is provided so as to surround the yoke and the first voice coil and the second voice coil are provided between the yoke and the magnet. Both of the two voice coils for driving the two diaphragms are provided SO as to be surrounded by the magnet. Therefore, the magnet can be extended outward. This causes a greater magnitude of magnetic flux to be provided to the first and second voice coils, and thus allows a louder sound to be generated.

According to the present invention, a thin speaker is provided, in which a sound generated from the front side or the rear side of at least one diaphragm is output from an arbitrary position through an acoustic pipe.

According to the present invention, the space between two diaphragms is divided using a yoke so as to acoustically shield the two diaphragms from each other. Thus, a speaker in which two diaphragms operate separately by an electric signal applied to each of voice coils is provided.

According to the present invention, the area of one diaphragm facing the sound hole adjacent to the display section of the mobile terminal device may be smaller than the area of the other diaphragm. In this case, the space in the vicinity of the display section in which the speaker is provided can be further reduced, so as to enlarge the display section. In a mobile terminal device having such an enlarged display section, the letters in e-mails and videos are easier to see.

The speaker according to the present invention, when mounted on a mobile terminal device, can act both as a receiver for reproducing a received sound signal, and as a loudspeaker for reproducing a call arrival sound signal, a music signal, a voice signal or the like. The functions which are performed by a plurality of speakers can be performed by one speaker. Naturally, one speaker occupies a smaller space than the plurality of speakers. Therefore, the size of the mobile terminal device can be reduced.

According to the present invention, the magnetic circuit of the speaker can be provided in the vicinity of the rear surface of the mobile terminal device, so that the sound may be output through the opening of the acoustic pipe having a smaller cross-sectional area than the cross-sectional area of the diaphragm. Thus, the mobile terminal device can have a larger display section while maintaining the size of the diaphragm. It is therefore not necessary to reduce the size of the speaker for reasons of a lack of space in the mobile terminal device. A mobile terminal device generating a high quality sound can still be provided.

According to the present invention, the opening of the two acoustic pipes may be provided in the front surface of the mobile terminal device so as to interpose the display section.

In this case, a compact mobile terminal device for reproducing a call arrival sound signal and a music signal is provided. In the case where the acoustic image adjusting section adjusts an electric signal to be applied to the speaker (for example, so that the acoustic image is enlarged), even a mobile terminal device including two sound sources closely adjacent to each other can reproduce a sound having an acoustic image comparable to a sound reproduced by a large-scale music reproduction apparatus.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A speaker, comprising:
   a first magnet;
   a second magnet provided so as to surround the first magnet;
   a yoke for connecting the first magnet and the second magnet;
   a first voice coil;
   a second voice coil;
   a first diaphragm connected to the first voice coil;
   a second diaphragm oppositely provided to the first diaphragm with respect to the first magnet and connected to the second voice coil;
   a first magnetic plate provided between the first diaphragm and the first magnet; and
   a second magnetic plate provided between the second diaphragm and the second magnet,
   wherein:
   the first voice coil is provided in a first magnetic gap between the first magnetic plate and the yoke, and
   the second voice coil is provided in a second magnetic gap between the second magnetic plate and the yoke, and
   a magnetization direction of the first magnet is opposite to a magnetization direction of the second magnet.

2. A speaker according to claim 1, further comprising a frame for supporting an outer peripheral area of the first diaphragm and an outer peripheral area of the second diaphragm.

3. A speaker according to claim 1, further comprising a first acoustic pipe for transmitting a sound generated by the first diaphragm.

4. A speaker according to claim 3, wherein the first acoustic pipe is located off a center of the first diaphragm.

5. A speaker according to claim 3, further comprising a cover oppositely provided to the first magnet with respect to the first diaphragm for covering the first diaphragm, wherein the first acoustic pipe projects from a space between the first diaphragm and the cover.

6. A speaker according to claim 3, wherein the first acoustic pipe projects from a space between the first diaphragm and the second magnet.

7. A speaker according to claim 3, wherein the first acoustic pipe has a cross-sectional area which is constant in a longitudinal direction thereof.

8. A speaker according to claim 3, wherein the first acoustic pipe has a horn shape.

9. A speaker according to claim 3, wherein the first acoustic pipe has a portion having a cross-sectional area which is larger than a cross-sectional area of the remaining portion of the first acoustic pipe.

10. A speaker according to claim 3, further comprising a second acoustic pipe for transmitting a sound generated by the second diaphragm.

11. A speaker according to claim 1, wherein the yoke exists between the first magnet and the second magnet, between the first diaphragm and the second magnet, and between the second diaphragm and the first magnet.

12. A speaker according to claim 1, wherein an area of the first diaphragm is different from an area of the second diaphragm.

* * * * *

UNITED STATES PATENT AND TRADEMARK OFFICE
CERTIFICATE OF CORRECTION

PATENT NO. : 7,106,878 B2 Page 1 of 1
APPLICATION NO. : 10/140133
DATED : September 12, 2006
INVENTOR(S) : Shuji Saiki et al.

It is certified that error appears in the above-identified patent and that said Letters Patent is hereby corrected as shown below:

<u>Title Page, Item (56) References Cited, FOREIGN PATENT DOCUMENTS</u>
Change "JP 62-277090" to -- JP 62-277000 --

Signed and Sealed this

Ninth Day of January, 2007

JON W. DUDAS
*Director of the United States Patent and Trademark Office*